(12) United States Patent
Dutta

(10) Patent No.: US 12,242,462 B2
(45) Date of Patent: Mar. 4, 2025

(54) SYSTEM AND METHOD OF TRACKING DATA AND PROVIDING A DIGITAL LOGBOOK AND DATABASE

(71) Applicant: 4F Applied Technologies, LLC, Tallahassee, FL (US)

(72) Inventor: Utpal Dutta, Fernandina Beach, FL (US)

( * ) Notice: Subject to any disclaimer, the term of this patent is extended or adjusted under 35 U.S.C. 154(b) by 159 days.

(21) Appl. No.: 17/102,323

(22) Filed: Nov. 23, 2020

(65) Prior Publication Data

US 2021/0157795 A1 May 27, 2021

Related U.S. Application Data

(60) Provisional application No. 62/939,306, filed on Nov. 22, 2019.

(51) Int. Cl.
*G06F 3/0484* (2022.01)
*G06F 16/23* (2019.01)
*G06F 3/04817* (2022.01)

(52) U.S. Cl.
CPC ...... *G06F 16/2379* (2019.01); *G06F 16/2365* (2019.01); *G06F 3/04817* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 9,766,079 B1* | 9/2017 | Poel | G01C 21/206 |
| 2003/0050801 A1* | 3/2003 | Ries | G16H 10/60 |
| | | | 705/2 |
| 2006/0095331 A1* | 5/2006 | O'Malley | G06F 16/9574 |
| | | | 705/22 |
| 2013/0339905 A1* | 12/2013 | Liu | G06F 16/22 |
| | | | 715/835 |
| 2014/0151446 A1* | 6/2014 | Bovell | G06Q 10/087 |
| | | | 235/375 |
| 2014/0324885 A1* | 10/2014 | McKenzie | G06F 16/5866 |
| | | | 707/748 |
| 2015/0081742 A1* | 3/2015 | Roys | G06F 16/9537 |
| | | | 707/802 |
| 2015/0161452 A1* | 6/2015 | McCarthy, III | H04N 21/44213 |
| | | | 348/143 |

(Continued)

*Primary Examiner* — Henry Orr
(74) *Attorney, Agent, or Firm* — Adrienne Love

(57) ABSTRACT

Systems and methods for electronically tracking one's location, activities, and behaviors for use in organizations such as prisons are disclosed. A database stores inputted information and may be encrypted. The user may attach files, pictures, videos, or the like. The logbook may have emoticons for tracking travel, medications, bed checks, and sights and sounds. A master facility view enables data viewing of users in a facility. Offline data entry and the ability to share information with other users are present. Preferably, the system will be integrated with cameras and scanning devices present in an organization, such that the user may use the scanning device at the organization to track his or her location, which will then be automatically integrated into the electronic system. The system may comprise Quick Response codes unique to the user or biometric assistance to detect and store the location of the user at any given time.

8 Claims, 36 Drawing Sheets

(56) References Cited

U.S. PATENT DOCUMENTS

2016/0247110 A1* 8/2016 Sinha ............... G06Q 10/06316
2017/0060508 A1* 3/2017 Österberg ............... H04W 4/02
2017/0147918 A1* 5/2017 Karani ............. G06K 19/07775
2017/0192414 A1* 7/2017 Mukkamala ........... G06Q 10/06

* cited by examiner

SYSTEM AND METHOD OF TRACKING DATA AND PROVIDING A DIGITAL LOGBOOK AND DATABASE

CROSS-REFERENCES TO RELATED APPLICATIONS

Pursuant to the provisions of 37 C.F.R. § 1.53(c), this non-provisional application claims the benefit of an earlier-filed provisional patent application. The earlier application was assigned Ser. No. 62/939,306.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to a computer-implemented method and system to assist businesses with keeping track and logging data. Specifically, the present invention comprises a method and system for allowing a user to track their duties and activities, while linking said data to an online database.

2. Description of the Related Art

The need for a digital log and tracking database system occurs mainly in organizations that employ many people and/or are responsible for mainlining records for many people, such as in prisons. Traditionally, activities, behaviors, and locations of individuals in an organization are tracked via a manual logbook, as illustrated in FIG. 1. The figure illustrates the log book of a correctional officer, but the reader will appreciate that the present invention may be used in any type of environment requiring logging of activity and location of individuals. User 24 uses writing instrument 26 to create log book entries 28 on manual log book 22. This process is tedious, requiring user 24 to manual write log book entries 28 using writing instrument 26. Because of the excess time this process takes up, user 24 may put off entering logbook entries 28 into manual log book 22 until many minutes or hours after the particular task is done, leading to data entry error because of the time that has past.

This current process takes a substantial amount of time and effort, requiring the user to manually log each event while it is fresh in their memory in order to obtain the most accurate log book entries. This takes valuable time away from the job at hand and is also subject to human error. Educational institutions, prison institutions, or other similar institutions are required to track many individuals' behaviors at once. In order to do so, the entity must collect accurate data on individuals relating to both the environment and the individual's interaction with and response to the environment. The accuracy and thoroughness of the data is important and there are criteria that must be met in order to provide a functional behavioral assessment and currently track one's location at any given time. However, these entities are usually ill-equipped to accurately collect and track this data. Therefore, the data may be skewed, incomplete, or inaccurate.

For the foregoing reasons, there is a need for a computer implemented method and system having an electronic logbook and activity tracker, with cloud-based storage. Additionally, it is advantageous for the user or client location to be tracked via biometric assistance such as finger and eye scans, and/or a personalized Quick Response ("QR") code. It is also advantageous to be able to categorize the information stored into various forms, share information stored, and attach pictures, videos, and/or video recordings to the electronic logbook.

BRIEF SUMMARY OF THE PRESENT INVENTION

The present invention is directed to a computer implemented system and method for tracking and logging a user's location, activities, and behaviors. The computer-implemented method and system provides a computer program for use on a computer usable medium (client server) which is capable of accessing a database server or other storage medium having a computer readable code. The system is completely paperless, and pairs with various devices including mobile devices for increased accessibility. The database server includes a series of linked databases that make up the computer program product. A user will log in to the system by providing a unique user ID and password, which will match to the user table database. The user table database is capable of providing the user with a user specific sub-set of data. This sub-set of data may be data that was entered by that user or written to the database by another user.

A mobile application prompts a user to record data through a series of graphical user interfaces which provide inputs for a user to select. Preferably, a user will use the system through a mobile device having a mobile application. However, the reader will appreciate that a web application could also be used. The data that is recorded by a user will be related to the actions, behaviors, and locations of individuals being observed or the user him or herself. The present method provides a means for recording and storing the data that is inputted by a user or other input device along with the capability of presenting that data in an organized manner.

The user or other individuals' locations may be tracked via other input devices such as cameras, unique QR codes, or biometric assistance such as finger or eye scanners. Thus, the system is preferably used in conjunction with scanning devices or cameras at a site. Specifically, a camera may capture the location of a user the moment the user scans his QR code to enter a room. Thereafter, the database will store the footage displaying the location of the user because the QR code prompted the system to collect said footage. Alternatively, a user may use an eye scanner or fingerprint scanner at a particular location, prompting the system to collect the location of said user at a given time and date and store such information into the database.

Apart from recording locations, an electronic logbook is included in the system, allowing a user to input subjective information about activities and behaviors of other individuals, such as inmates. This "virtual note-taking" may be done through typing, script-to-text, swipe-to-text, and voice-to-text. The electronic logbook allows the user to categorize information while also including metadata regarding such information. For example, the user can input notes and also attach photographs, videos and forms. The metadata behind the attachments is also included (e.g. the date a photograph was taken, the type of camera used, owner of the camera, etc). The user can also modify information or notes using highlights, strike-through, copy and paste, and various font colors. This system allows for comprehensive collection of data with minimal to no training of the user.

Configurable emoticons are available to categorize data, trigger rules, monitor and capture timed activities, and integrate with other outside functions such as visitor logs. A visual history may also be available via tagging functionality which is done automatically by facial recognition or manual tagging. The database may include task functions that may be inputted by the user, including travel time, medications, bed/cell checks, and other automated report generation upon completion of the particular task. The user may be able to enter notes and complete certain tasks via short message service ("SMS") text while also adding metadata such as location automatically. There is automatic date and time stamping for all activities to maintain data integrity.

A master facility view allows viewing of data from all sub-facilities from a single view, filtering based on notes, user screens, and/or sub-facility. The system can assist in aggregating data to identify trends. For example, the system may identify that more errors occur in dosing medication when it is distributed to inmates at the end of a nurse's shift. If that is the case, the prison may benefit from a different schedule—e.g. by distributing medication at the start of a nurse's shift.

Field level security is available with encryption. Offline data entry and functions are available as well. Finally, the system allows for a user to share information inputted with other users on the system. The user's profile is pin protected, and all files shared are password protected, providing for additional data integrity.

BRIEF DESCRIPTION OF THE SEVERAL VIEWS OF THE DRAWINGS

Figure 1:
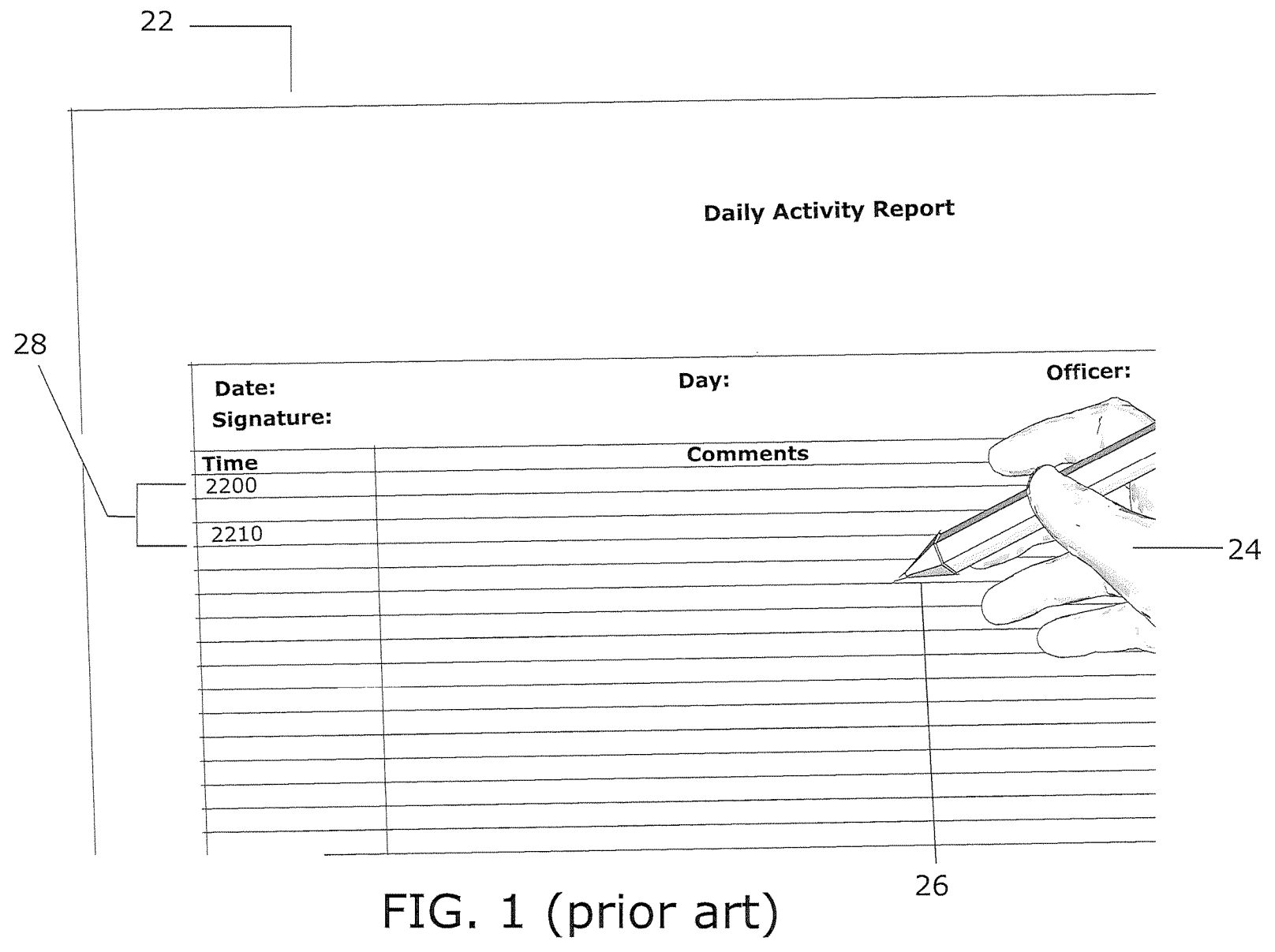

FIG. 1 is a perspective view, showing a prior art logbook in use;

FIG. 9 is a screen shot, showing the user database of the present system;

FIG. 10 is a screen shot, showing the facility database of the present system;

FIG. 26 is a screen shot, showing a profile of an individual (client) monitored using the interface of the present system;

FIG. 30 is a screen shot, showing a discharge form on the interface of the present system;

Figure 2:
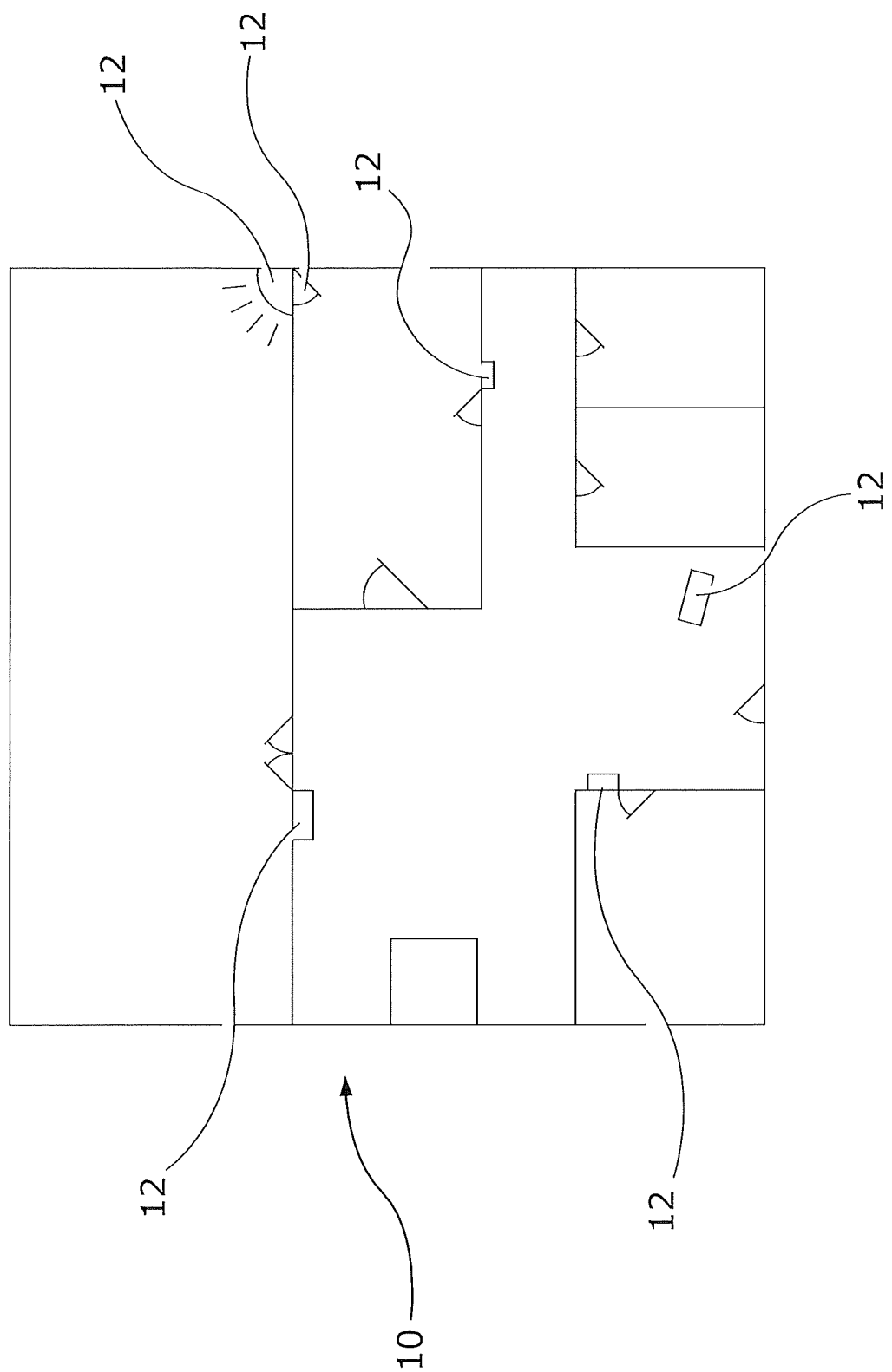
FIG. 2 is a schematic view, showing a simplified depiction of the site at which, the present system and method is implemented.

REFERENCE NUMERALS IN THE DRAWINGS 10 site
12 input device
14 mobile device
16 fingerprint scanner
18 iris eye scanner
20 graphical user interface
22 manual logbook
24 user
26 writing instrument
28 logbook entry
30 QR reader
32 server
34 computing device
36 processor
38 video camera 40 database
42 microphone
46 cellular service provider
48 wireless router
50 laptop
52 computer
54 time entry area
55 text entry area
56 tablet
58 QR code
60 display
62 pie chart
64 note log
66 tool bar
68 bar graph
70 trending table
72 report page
74 emoticon
76 note
78 rule
80 form
82 task
84 profile
86 note icon
88 client icon
90 location icon
92 facility icon
94 document icon
96 pop-up wheel
98 camera icon
100 microphone icon
102 highlighter icon
104 attachment icon
106 pop-up window for active notes
108 submit icon
110 pop-up window for facility
112 attachment review icon
114 save icon
116 task icon
118 pop-up window for task creation
120 pop-up window for task list
122 add button
124 tag saved note icon
126 strike out icon

DETAILED DESCRIPTION OF THE INVENTION

The present method and system is a computer program product and method for allowing a user to input, store and compile data including the location of a person, log notes, file reports, behavior and biographical information of different persons while managing a group of persons in a controlled environment, such as a prison or a school.

Figure 3:
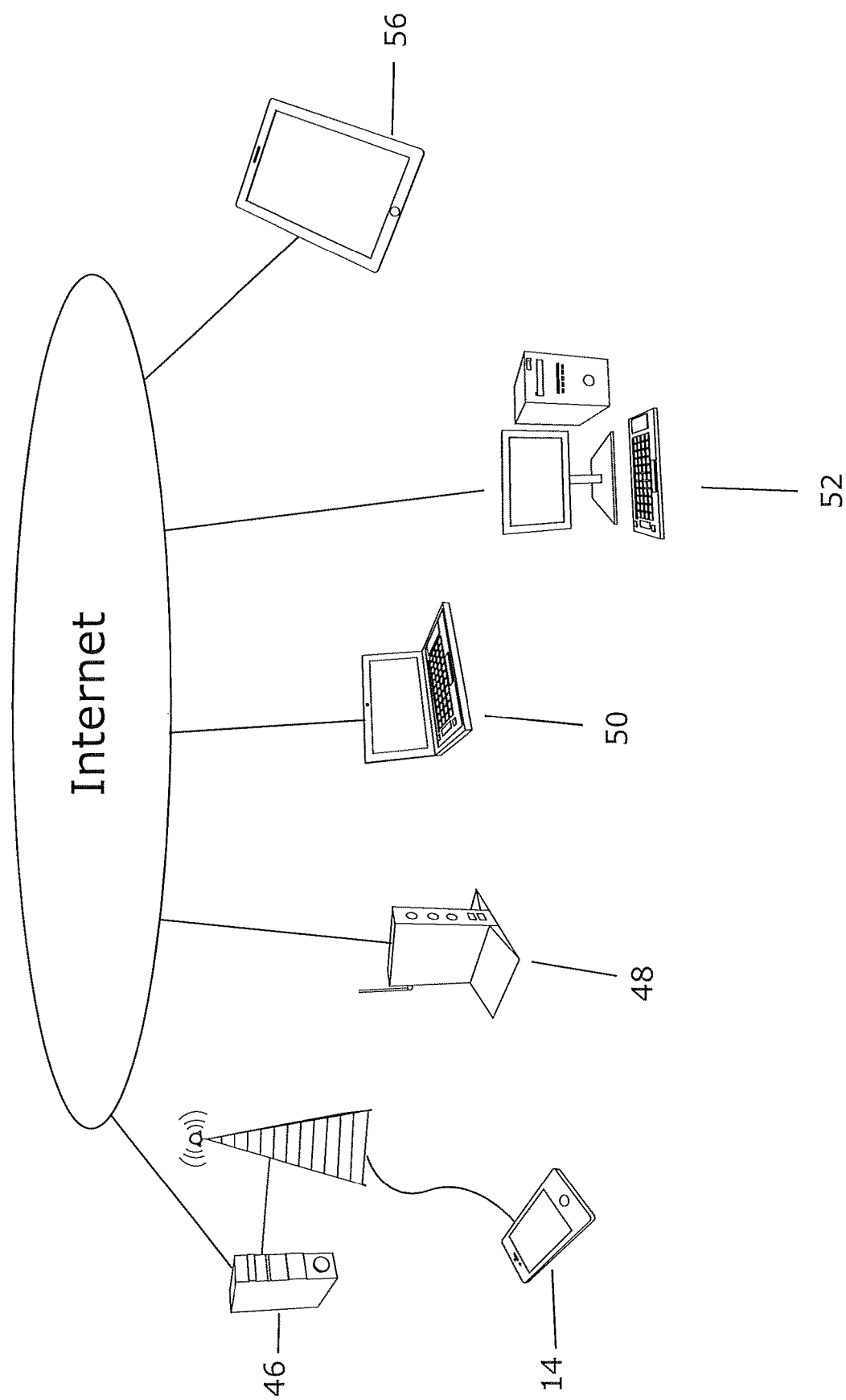
FIG. 3 is a schematic view, showing some of the hardware components of the present system and method.
Figure 4:
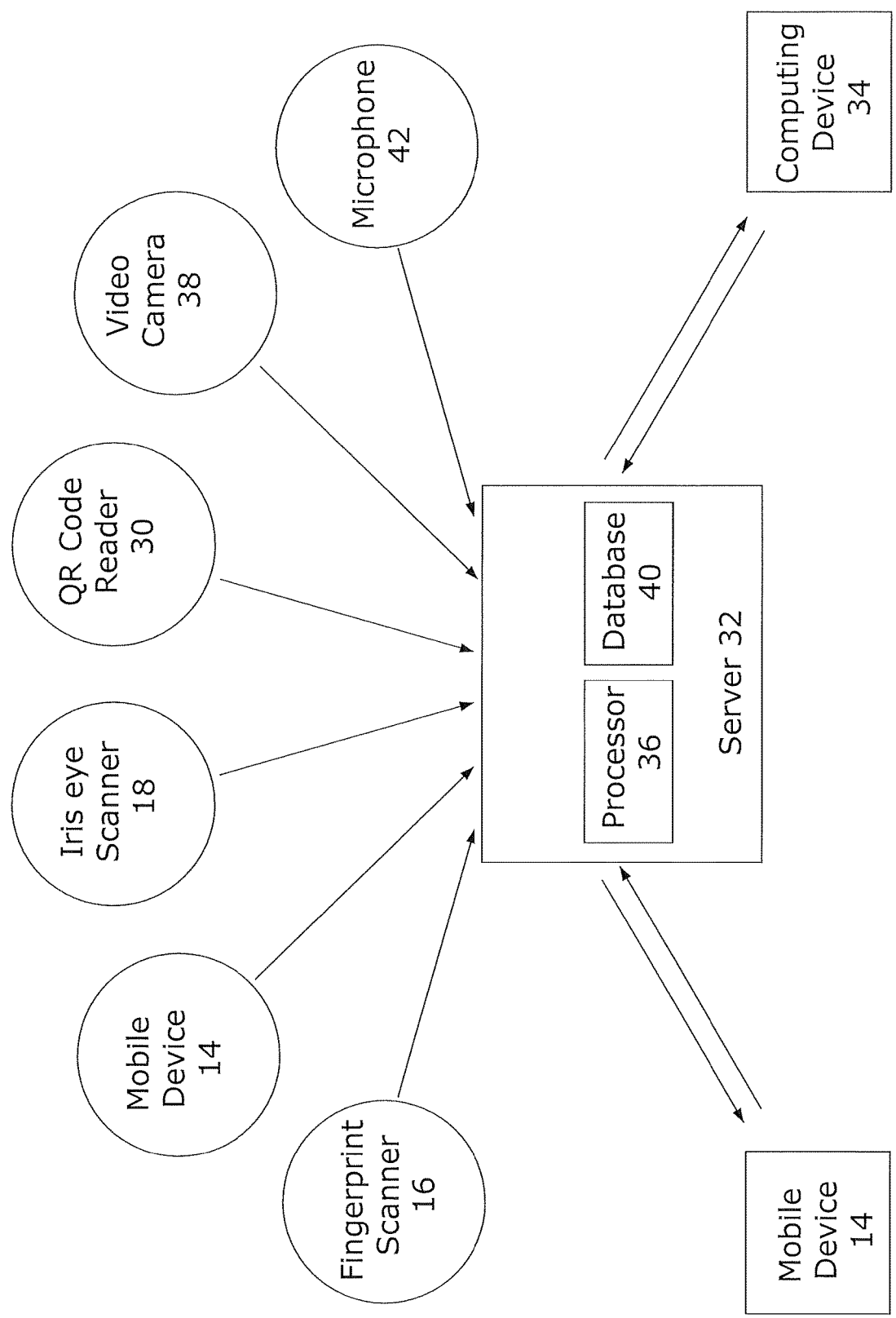
FIG. 4 is a schematic view, showing the hardware components of the present system and method in one embodiment.

FIG. 2 illustrates the controlled environment, such as a prison or a school, in a schematic view. A series of input devices 12 are used in and around the environment or site 10 which act to collect data (for purposes herein, this data collected is referred to herein as second set of data). Input devices 12 can be any type of input device that is capable of collecting, tracking and transferring data. For example, as shown in FIG. 4, fingerprint scanner 16, mobile device 14, iris eye scanner 18, QR code reader 30, video camera 38 and microphone 42 act as input devices. Additionally, a user can utilize a mobile device 14 to collect or input data regarding an individual's activities. FIG. 3 shows that input devices 12 are connected to the internet via a wireless router 48 (a "communication link"). The reader will appreciate that input devices 12 could be connected to the internet via hardwire (another "communication link") or any other known method. The input devices 12 collect first and second sets of data and transmit that data to a database on a server 32. The server could be a local or remote server. Therefore, the data could be collected and transferred to a local (on premises) physical server or a remote (virtual) server on a cloud computing platform via the internet (through any communications link).

FIGS. 3 and 4 depict exemplary hardware that the present system and method may be used in connection with. Communications are preferably conducted over the internet since this will give the broadest possible access to portable devices. However, the reader will appreciate that the present system and method has an offline data entry function, allowing for certain functions while not connected to the internet with the ability to show the last facility the user was logged in to. A user may access the present system and method through the internet via mobile device 14 through cellular service provide 46 or via "wi-fi" through wireless router 48. Using mobile device 14, a user also has the ability to enter notes via short message service ("SMS") and enter particular task types. Such data collected via SMS will add meta data, such as the user's location, automatically into the database and be stored for future evaluation. Wireless router 48 may also provide internet access to laptop 50 and tablet 56 such that the user may access the graphical interface of the present system and method via laptop 50 or tablet 56. Desktop computer 52 may also be used to access the present invention via the internet. While not shown, the reader will appreciate that a user has the ability to print forms and information from the present system and method using any device described above with the ability to print or communicate with a conventional printer. FIG. 4 shows input devices such as fingerprint scanner 16, iris eye scanner 18, QR code reader 30, video camera 38 and microphone 42 interacting with server 32 on which computer program product is executed (computer readable code is capable of being executed on server or server system). A processor 36 and database 40 reside on server 32. A user can interact with the system utilizing a mobile device 14 or a computing device 34. The reader will appreciate that mobile device 14 preferably has a mobile application that is capable of providing a user interface that simplifies the input and output of data from server 32. Database 40 provides data in the form of stored information collected by input devices. The user may access information stored in database 40 via computer program product and view, edit, or add notes or additional information.

One important input device, a mobile device 14, includes a mobile application which prompts a user to record a first set of data through a series of graphical user interfaces which provide inputs for a user to select. As explained herein, this first set of data is related to the actions and behavior of individuals (clients, inmates, students, patients, etc.) who are observed in a controlled environment, such as prisons, schools, hospitals, and the like. The present method provides a means for assessing the data, inputting the data, and providing a presentation of the data in a modified form by way of charts, graphs, and compiled data.

Figure 5:
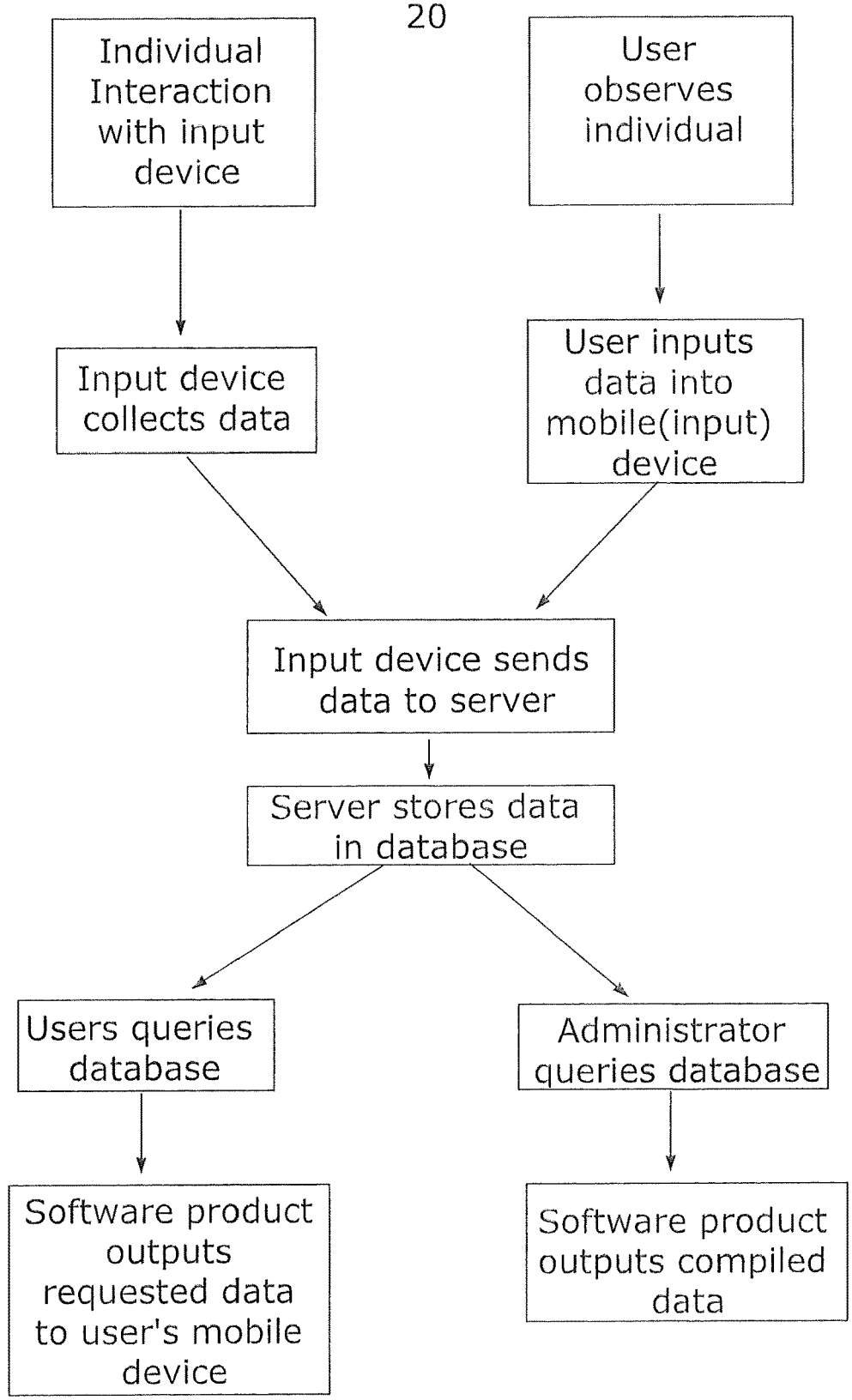
FIG. 5 is a flow chart, showing the present computer program product and method.

FIG. 5 illustrates the steps of the present computer program product and method. While the present method is illustrated in a series of steps, the reader will appreciate that the steps may be executed in a number of different variations. In the present embodiment, an individual, such as an inmate, interacts with an input device 12 and the input device 12 collects certain data, in this case a second set of data. For example, an inmate may enter a room by scanning a QR code on a QR reader 30 at the door to the room. The QR reader 30 collects the time and date that the inmate entered the room and the door through which the inmate entered. This data is transmitted to server 32 where it is stored in a database. At some point in time, a user may wish to compile the activities of a specific inmate on a particular data. The user could query the database and the software product would output the requested data to the user's mobile device in an organized manner. Thus, the user may see that the inmate data requested shows the inmates activity around the site 10 on the date requested. A first set of data can be collected by observation and input through a mobile application. For example, a user may observe and document an inmate's behavior or activity at a specific time and enter that first set of data using a mobile application on the user's mobile device. The mobile application has interfaces which allow for simple inputs to collect data, as described further herein. Once the first set of data is entered into the mobile device, the device sends that first set of data to the server where it is stored in the database. Note that although the description refers to a first and second set of data, there is not sequential basis to the data. The terms "first" and "second" are only used to differentiate data collected based on input by a user (first set of data) and data collected based on an individual's (in this case client, such as student or inmate) interaction with an input device (second set of data). Again, a query can be run by a user to obtain the collected data (both first and second sets of data). Similarly, an administrator can run queries for data on a database to analyze compiled data. The compiled data may reveal patterns that may assist with managing the site. For example, compiled data may show that medical professionals on site are more likely to make a mistake in administering medication at the end of their shift. The site manager may decide to administer medication at the start of the medical professional's shift to avoid such mistakes.

Figure 6:
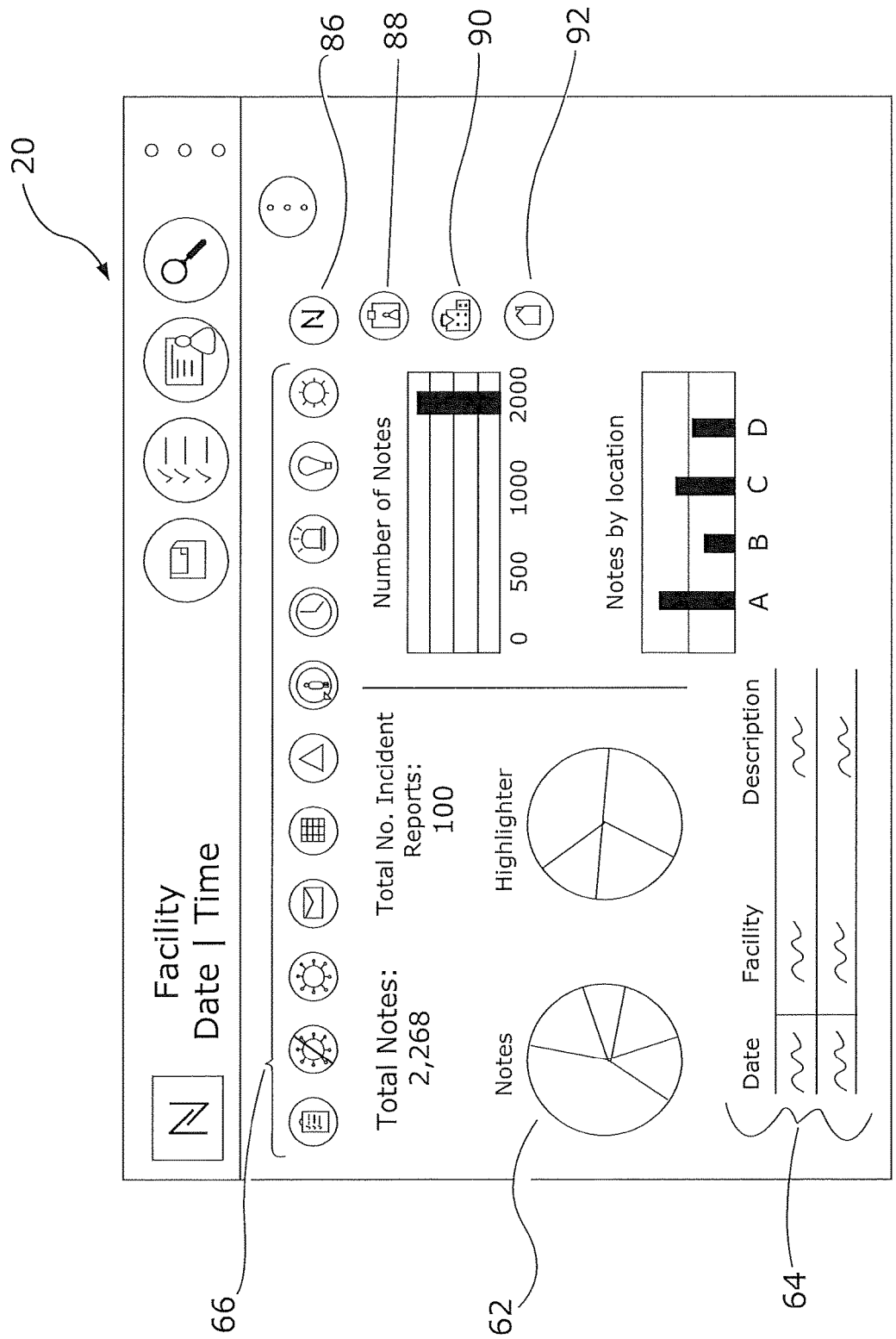
FIG. 6 is a screen shot, showing a version of the summary screen of the user interface provided by the present system.
Figure 7:
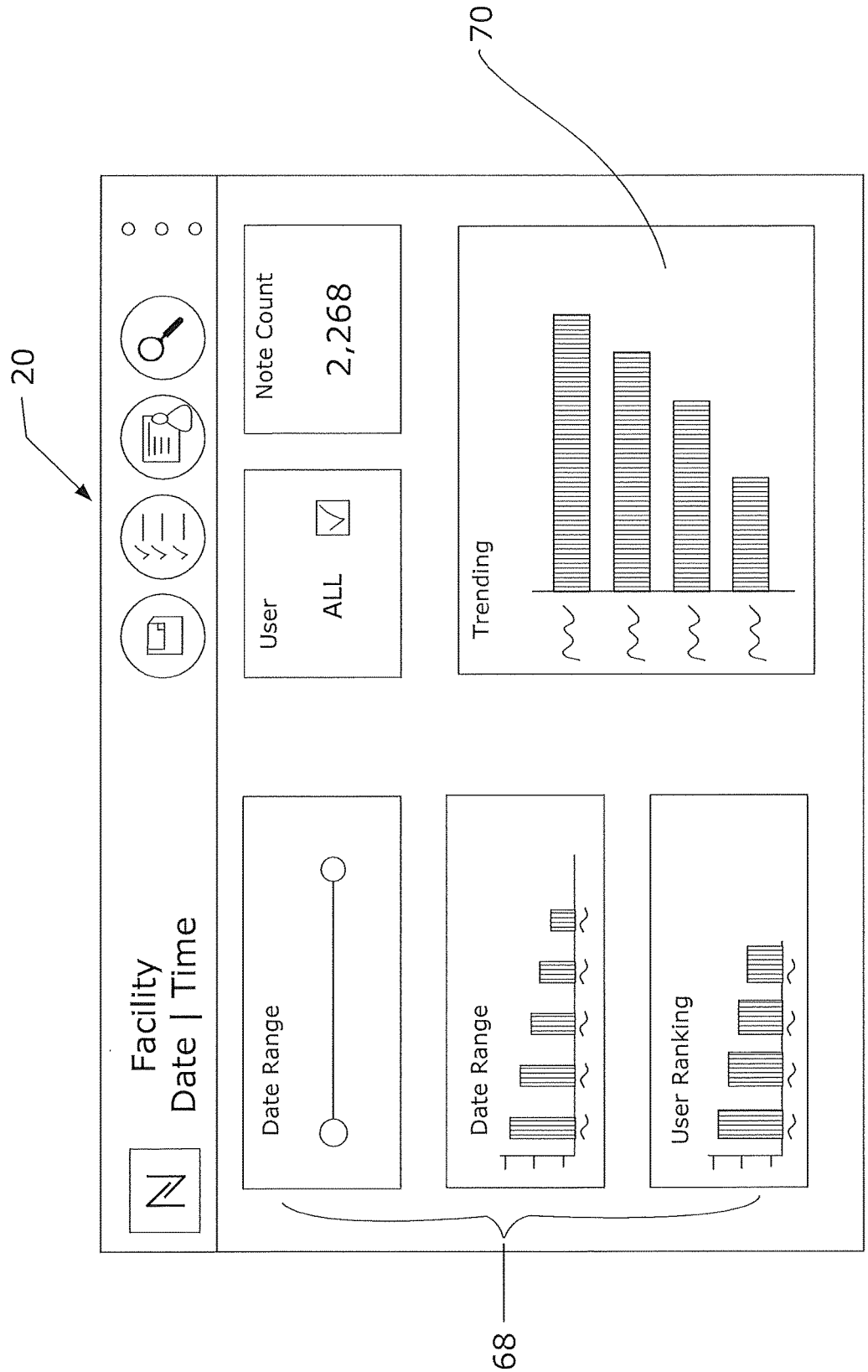
FIG. 7 is a screen shot, showing a user interface of the compiled graphical stored data provided by the present system.

A series of screen shots describe the implementation of the present system and method. FIGS. 6-7 illustrate screen shots of the present method after a user logs into the present computer program product showing exemplary graphical user interfaces 20. The reader will appreciate that any login method can be utilized. For example, a user could have a unique username and password, or a user may need further identification, such as a unique pin for a facility. Likewise, the facility itself could have a login username and password and each user may have a unique pin.

As shown in FIGS. 6-7 graphical user interface 20 includes tool bar 66 and several "quick entry" floating icons consisting of note icon 86, client icon 88, location icon 90 and facility icon 92 (collectively, quick entry floating icons). As will be further described herein, upon entry of a note 76 (shown and described in FIG. 13), a user can easily tag items by utilizing these "quick entry" floating icons (86, 88, 90, 92). Another set of icons at the top of the screen allows a user the ability to easily navigate to different pages, as described herein. A series of icons 66 are also located on the screen and allow the user access to different webpages.

The user can view various graphical representations that have been created using the data from the user's activity on computer program product's graphical user interface 20 (visual meta data). This allows a user to read, recognize, and process information that has been collected in order to optimize use of the present system and improve overall function. For example, pie chart 62 displays that relative time the user spends on any one task, gathered from the meta data collected when user uses computer program product. Graphical user interface 20 of computer program product also displays the total number of notes and incident reports made by the user. Note log 64 displays the most recent notes taken by the user by date, facility, and description. FIG. 6 displays various bar graphs 68, illustrating the present system's ability to display a user's activity based on a particular date range. This page may be navigated to using tool bar 66 or other function (such as a drop-down list). FIG. 6 also depicts trending table 70 in this example, displaying various tasks performed by a user from most frequent at the top to least frequent. These dashboard (overview) screen depictions are exemplary, and many other variations of a dashboard screen may be implemented. Likewise, graphical user interfaces 20 of the present program can vary from page to page and are also exemplary, as many other designs can be utilized. FIG. 7 illustrates additional overview information, including a trending table 70 and bar graphs 68 for the user to view.

Figure 8:
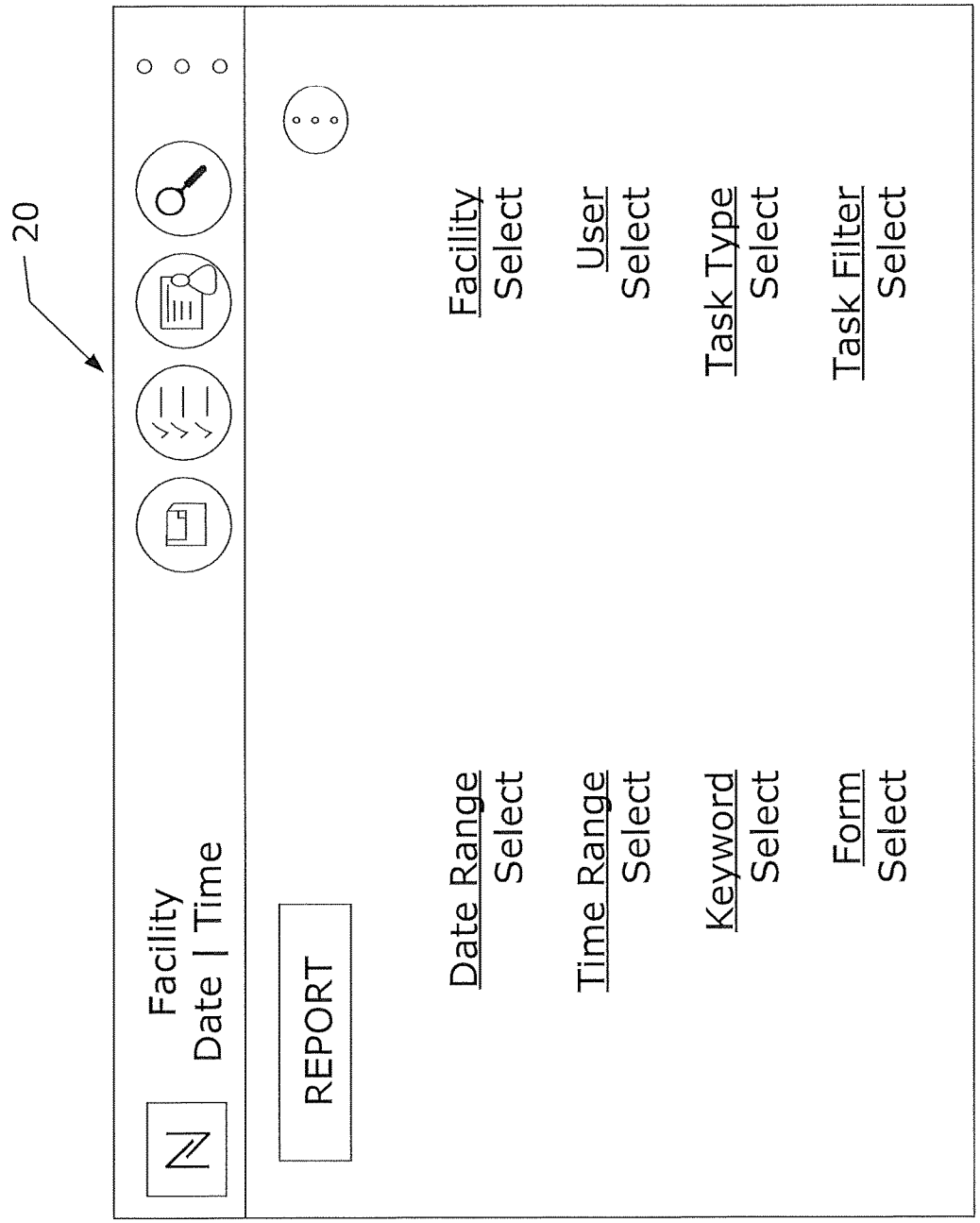
FIG. 8 is a screen shot, showing the report entry page of the present system.

A user may use tool bar 66 to navigate to the report page 72, as shown in FIG. 8. Report page provides a place for the entry of information to filter collected data and run a report based on that data over a set period of time. The user can select a date range, facility, form, task or other identifier. It is in the manner that a user could filter through data in an aggregate format and run a report to identify or show trends. For example, a user may wish to identify how frequently a certain task is completed in one facility and compare that data to a second facility. The reporting function allows a user a simple way for the user to view the data collected and stored in the database in an organized manner.

Figure 9:
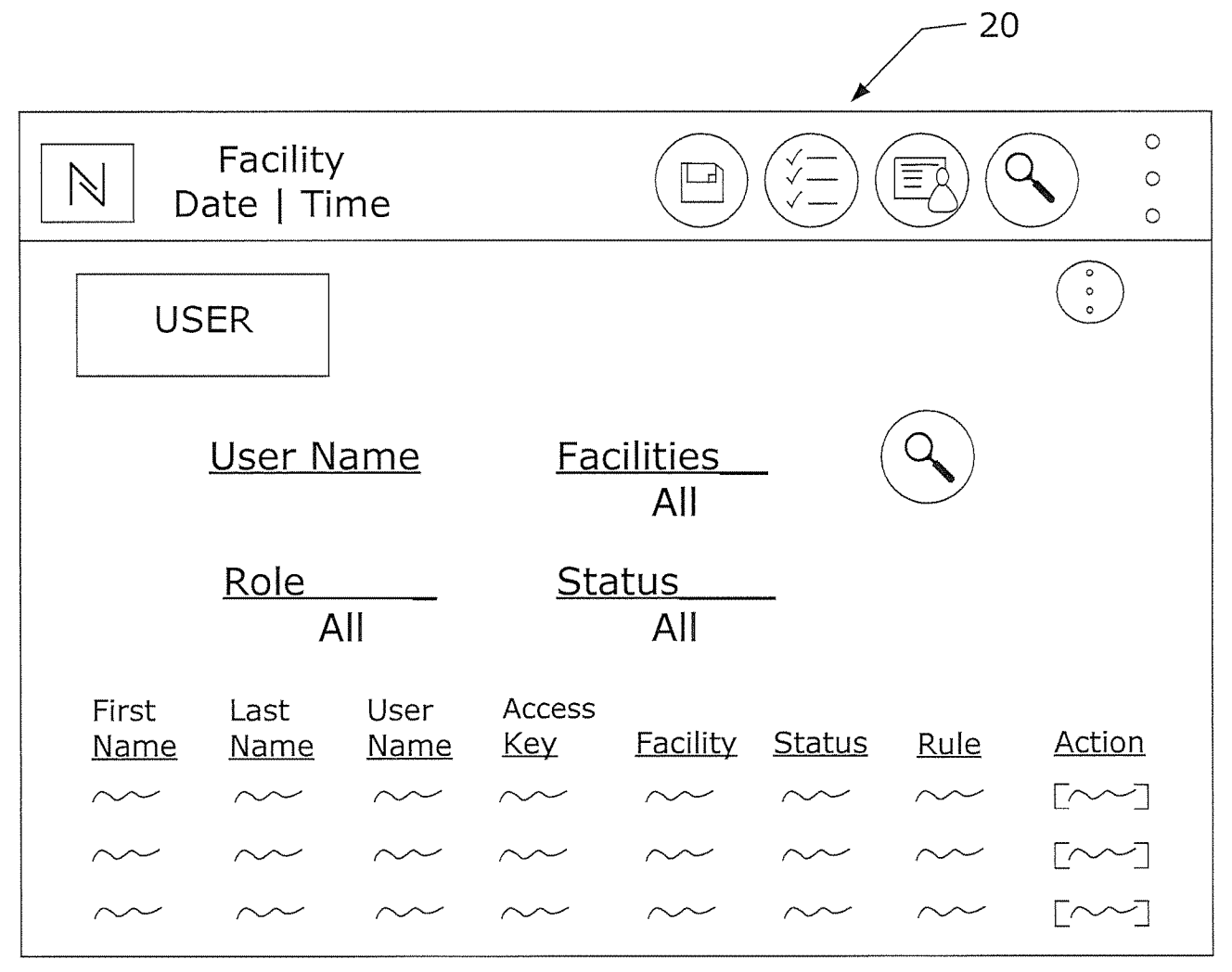
Figure 10:
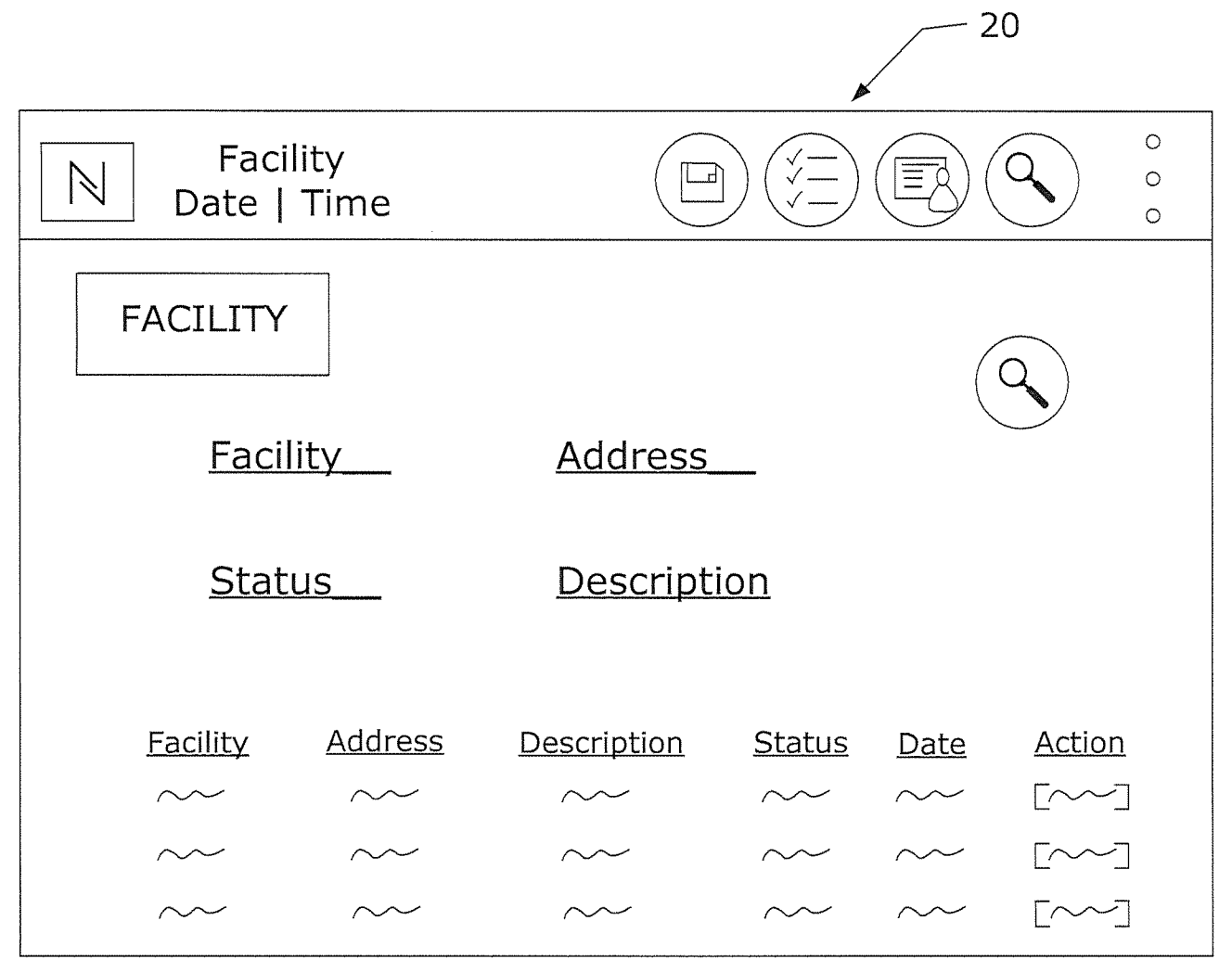

FIG. 9 shows one graphical user interface of computer program product that lists users authorized in the current program, while FIG. 10 shows the facilities equipped with computer program product 20. Each may be navigated to using tool bar 66. In some instances, these pages (along with those depicted in FIGS. 11 and 12, at least) can only be accessed by an administrator, with security credentials. As shown in FIG. 9, a list of users at a specific facility or all facilities can be viewed and edited by an administrator on this page. Access keys can be reset, facilities or multiple facilities can be designated to the user and a role can be assigned. FIG. 10 allows an administrator to view and edit data from each facility (or all facilities) in a single view. The present computer program product 20 may be used by a hospital, prison or correctional institution, a school, or any other like facility that must monitor various individuals at any given time.

Figure 11:
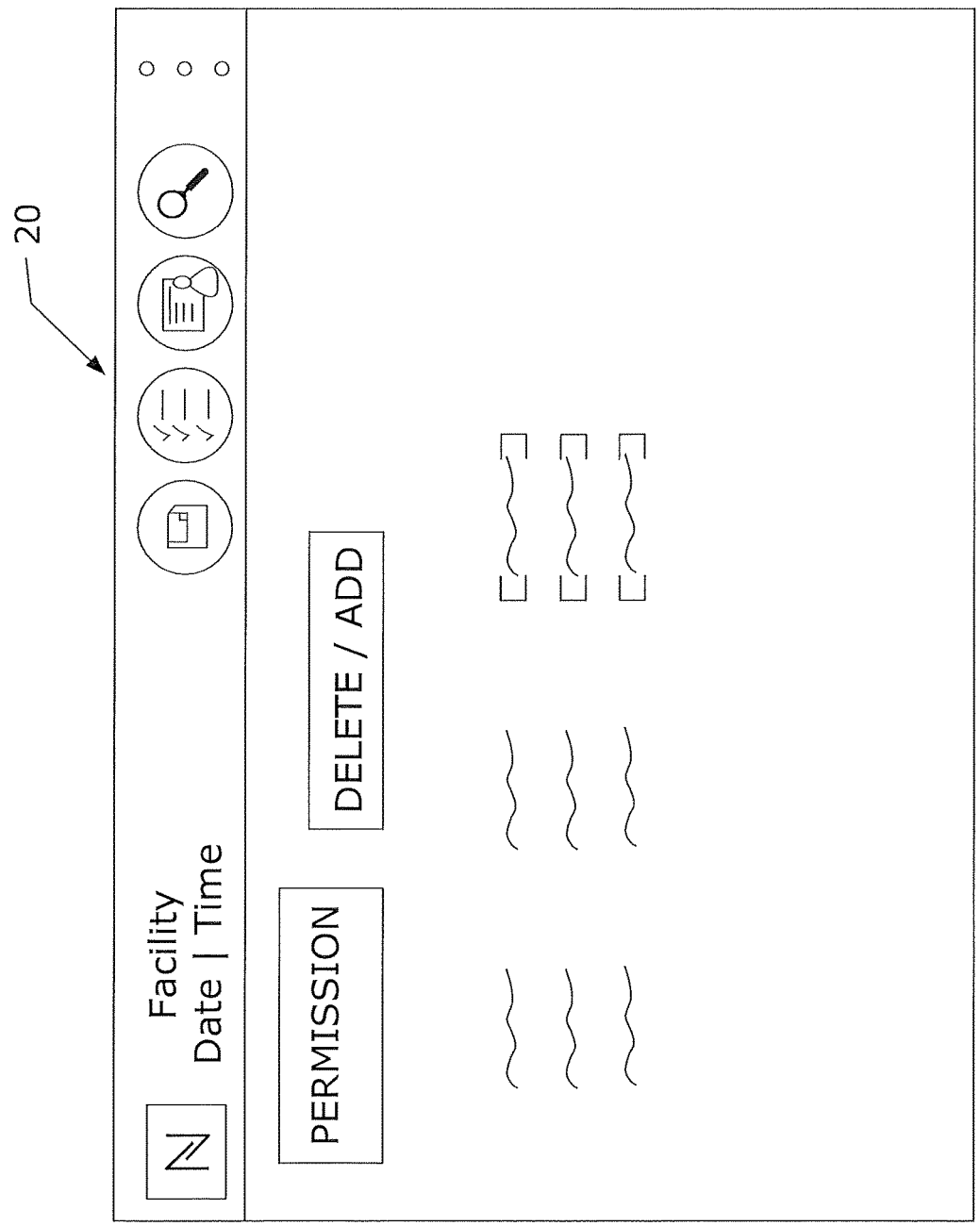
FIG. 11 is a screen shot, showing the permission page for the interface of the present system.

FIG. 11 shows the permissions page, which is used by the facility itself and may be navigated to using tool bar 66. The permissions page allows an administrator to determine which users and/or sub-facilities have access to which aspects of computer program product 20.

Figure 12:
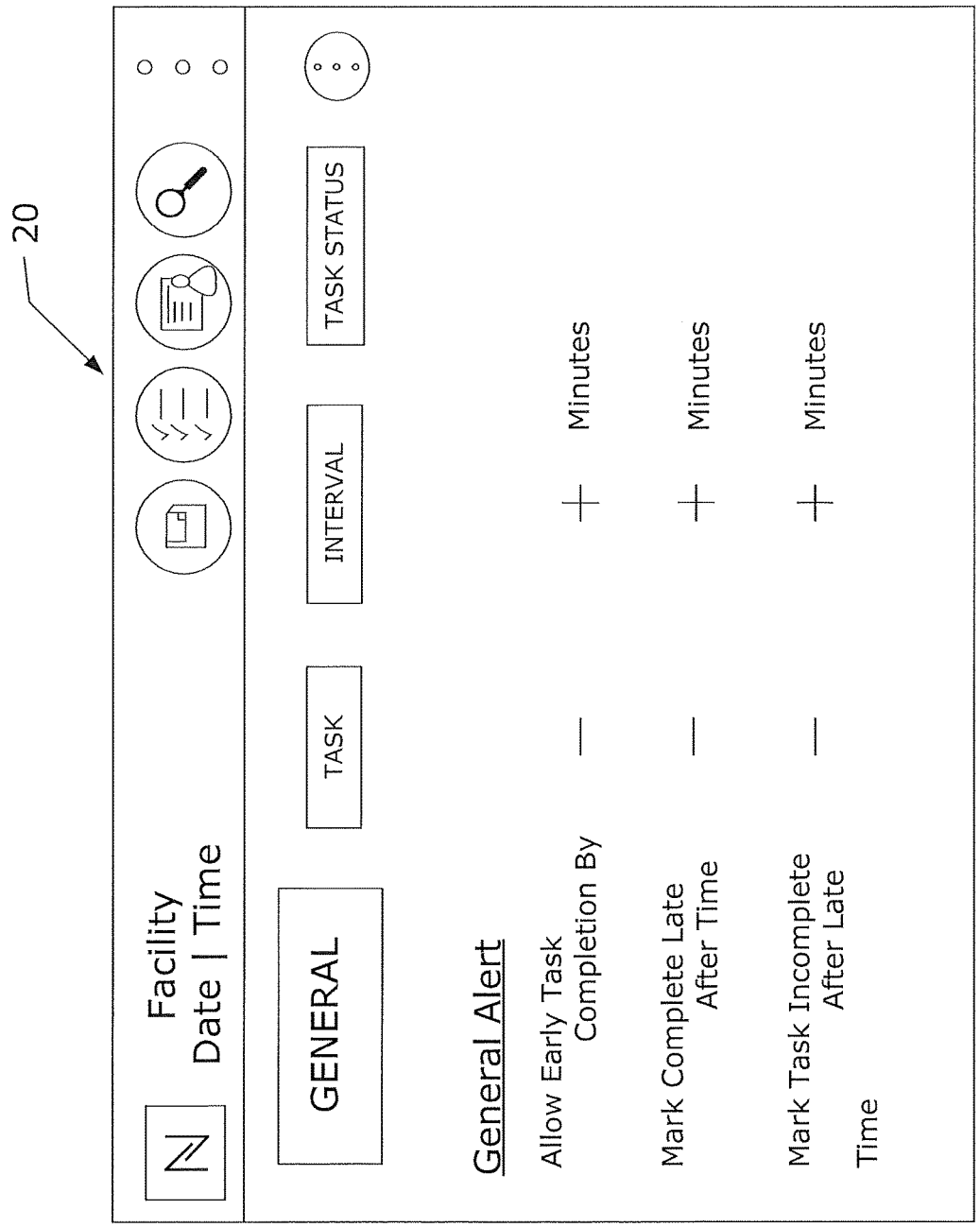
FIG. 12 is a screen shot, showing the general task page of the interface of the present system.

FIG. 12 illustrates a general screen, which may be navigated to using tool bar 66. This screen allows an administrator to set parameters for task completion and notifications. For example, a user may designate the ability to complete an "early task" 60 minutes in advanced from when the task has been designated complete. This figure is exemplary of the advantage of the present system and method.

Figure 13:
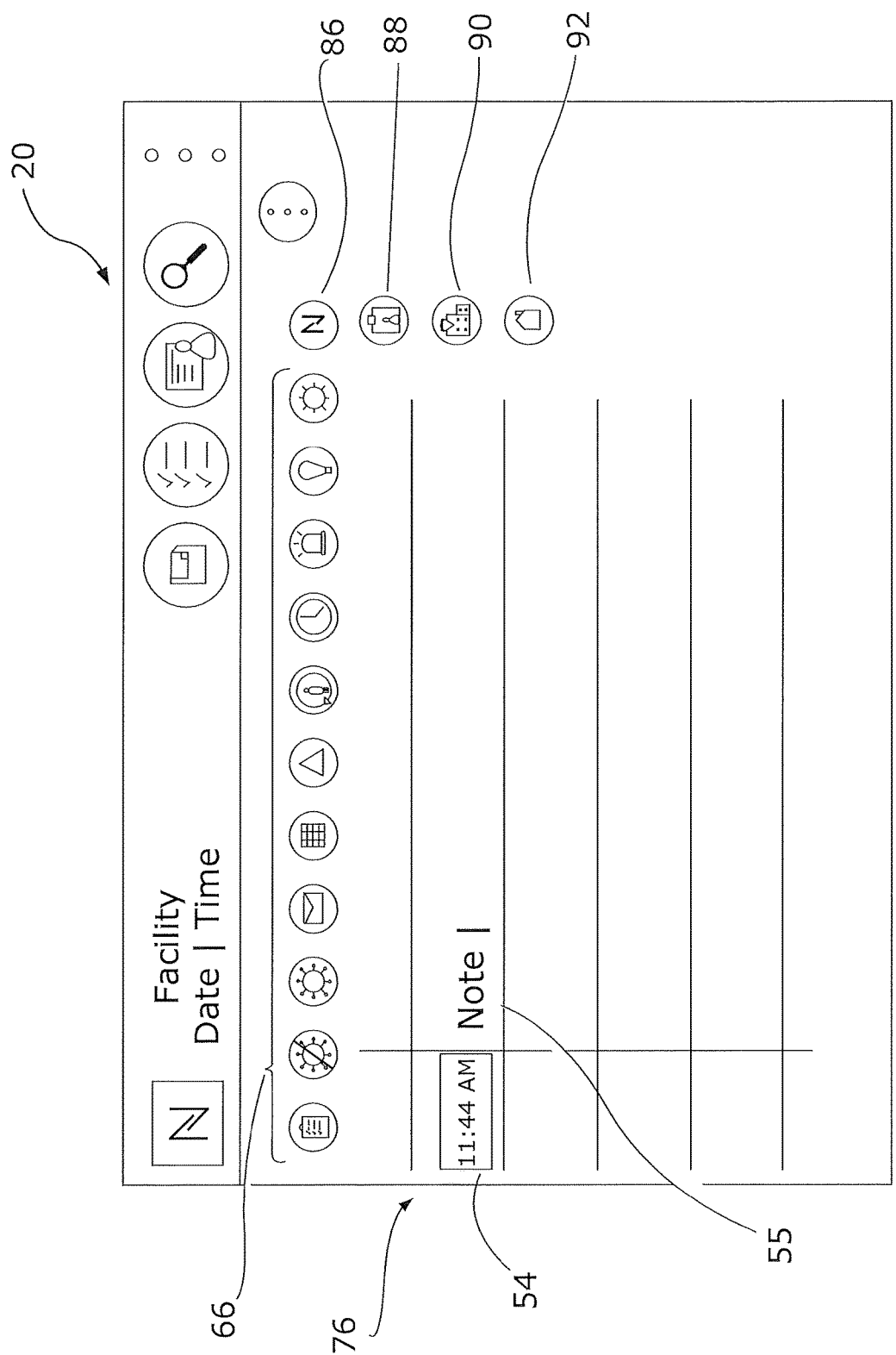
FIG. 13 is a screen shot, showing the note input page of the interface of the present system.

FIG. 13 displays on of the main screens or pages (graphical user interface 20) of the computer program product 20. Generally, computer readable code will be executing a set of instructions on a mobile computing device (and also on the server system as a whole) for the user to interact with on the same. A typical user will interact with this note page on a frequent basis by collecting and inputting data through notes 76 (here, the first set of data is that data associated with the note). Computer program product 20 allows users to take comprehensive notes 76 efficiently and in an organized manner. A first set of data makes up note 76. Once note 76 is completed (or as data is entered), the first set of data is saved and provided to the central database. The computer program product can report on that data, along with other data aggregated together. To begin a note 76, user clicks on any point on a row (either time area 54 or text area 55). The reader will appreciate that any known method of starting note 76 or entering data into note 76 can be utilized. The time area 54 is automatically populated with the current time. The date is also automatically associated with the note 76. A user can then begin to type the text of the note 76 that the user wishes to enter in text area 55.

Four floating "quick entry" icons are available for the user to quickly tag each note. Note icon 86 can be used to open all predefined words or phrases associated with an image (for example, so that the user is not required to type but can simply select a common word or phrase used often in notes) or it can be used to view recent descriptions of notes so that the user can easily insert text from a recent note. User can toggle between the two options by any known method. For example, in one embodiment user can long press on the note icon 86 to open a list of predefined words or phrases associated with an image or double tap on the note icon 86 to open a list of recently used phrases or words to insert. When using the note icon 86, the predefined word or phrase is associated with an image so that when the text is added, the image also is added and is easy to spot similar entries. Likewise, a user can select the client icon 88 to open a list of clients (e.g. inmates, students, etc.) to tag to a note, the location icon 90 to open a list of locations within the facility (e.g. cafeteria, classrooms, cell numbers, etc.) and the facility icon 92 to open a list of facilities (e.g. cell block or pod, school within district, etc.). Each list preferably includes a search functionality.

Figure 14:
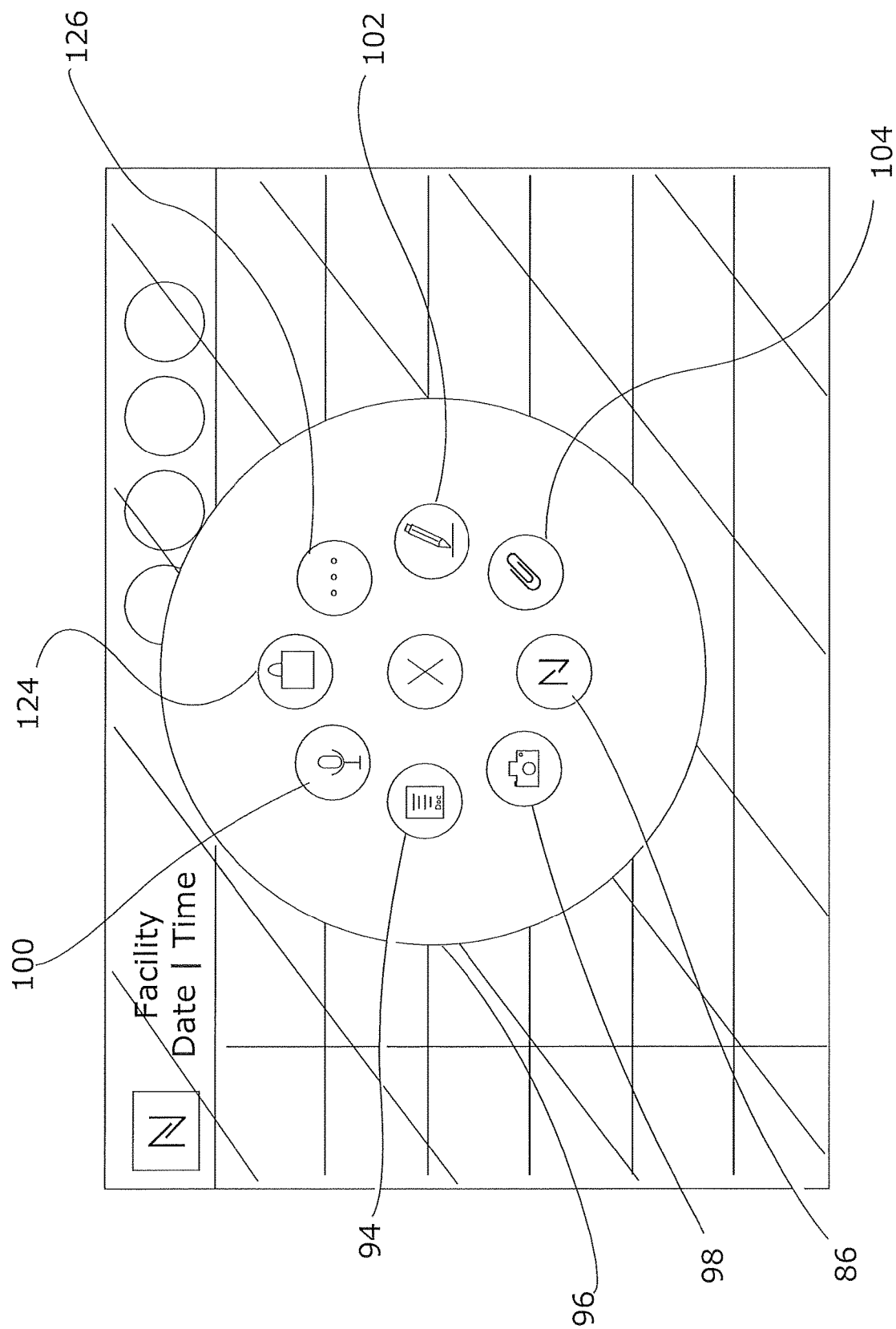
FIG. 14 is a screen shot, showing a pop-up screen to enter information associated with a note for the present system.
Figure 16:
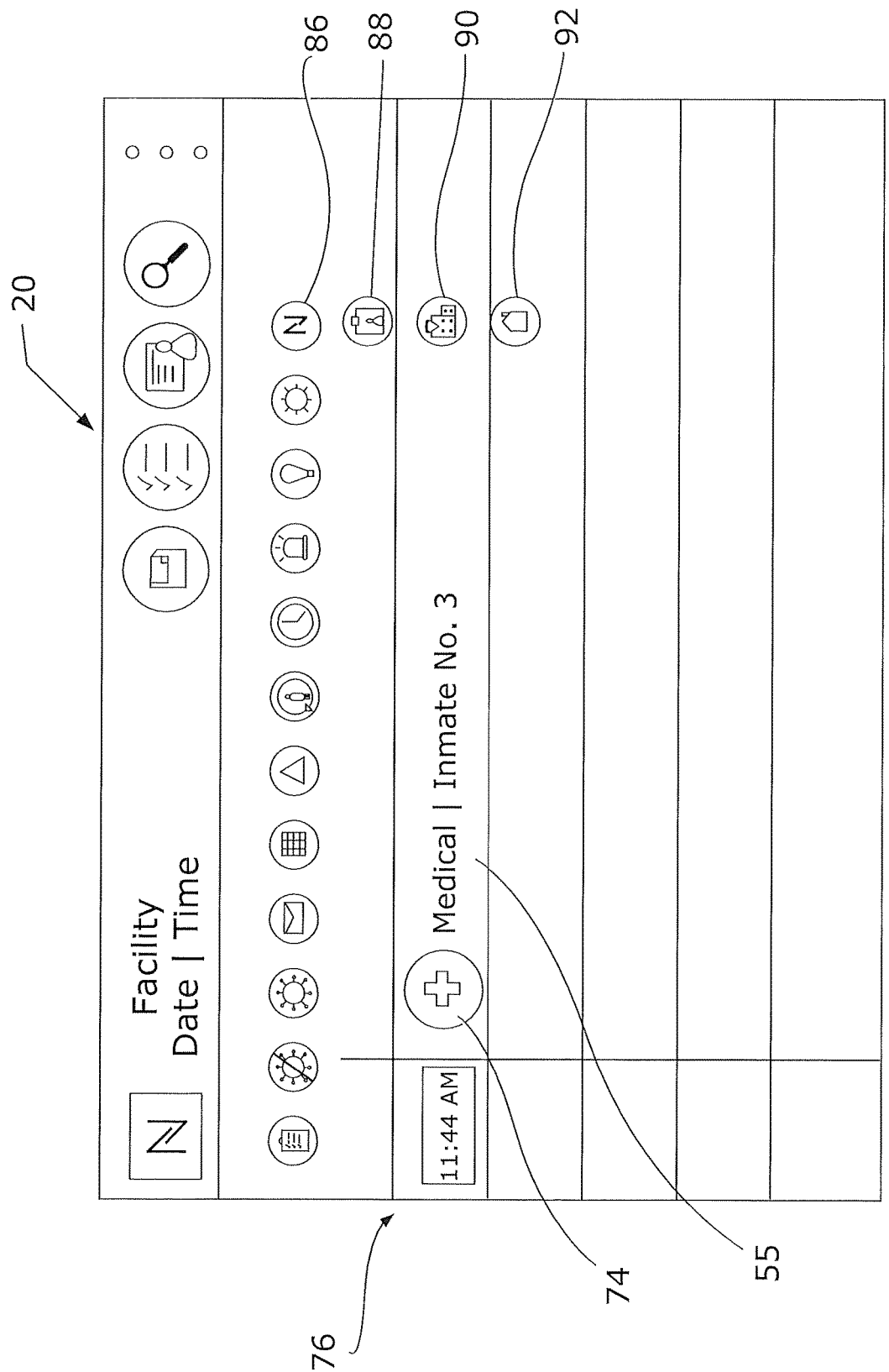
FIG. 16 is a screen shot, showing the note input page of the interface of the present system.
Figure 17:
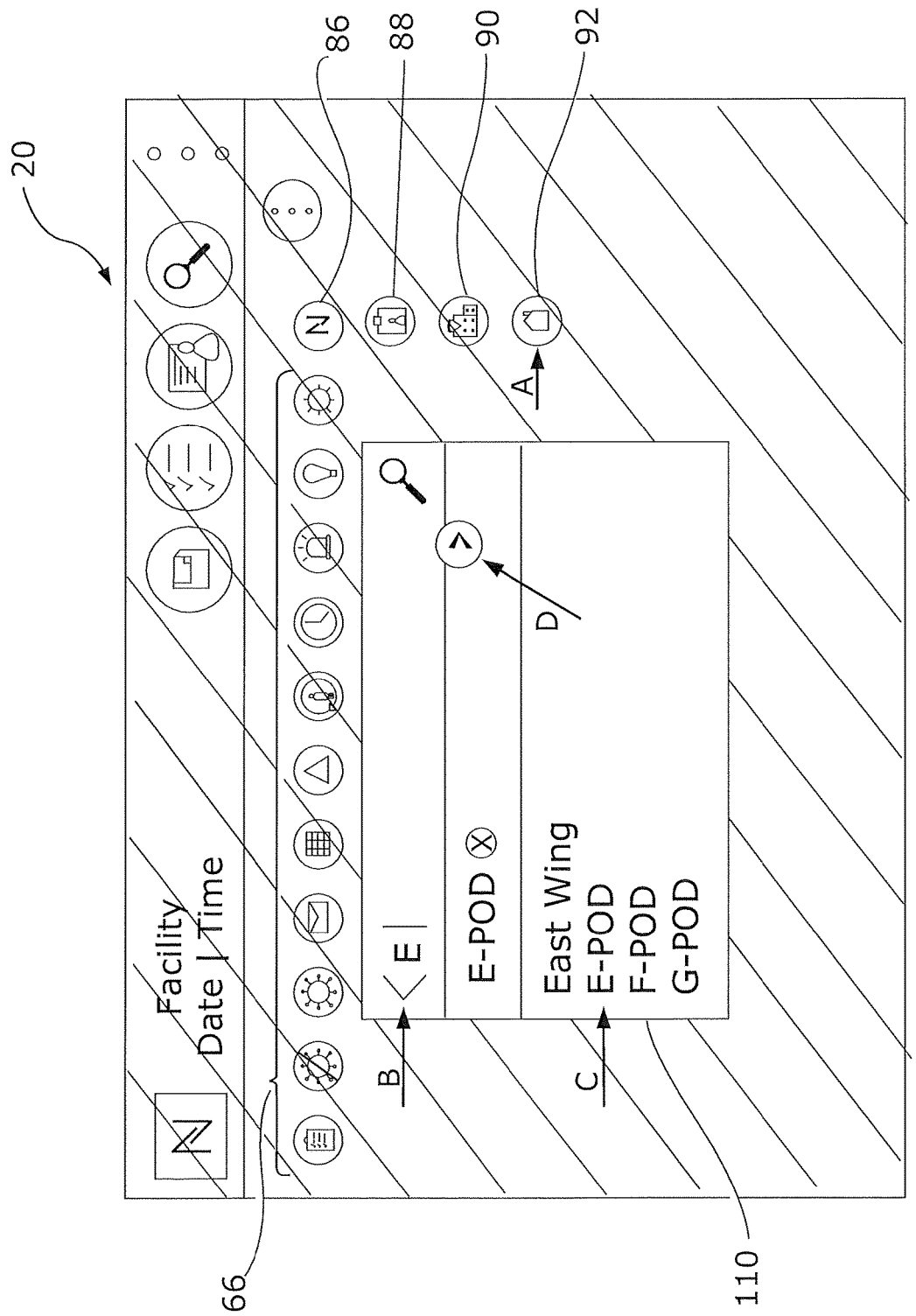
FIG. 17 is a screen shot, showing a pop-up screen to enter facility information associated with a note for the present system.
Figure 18:
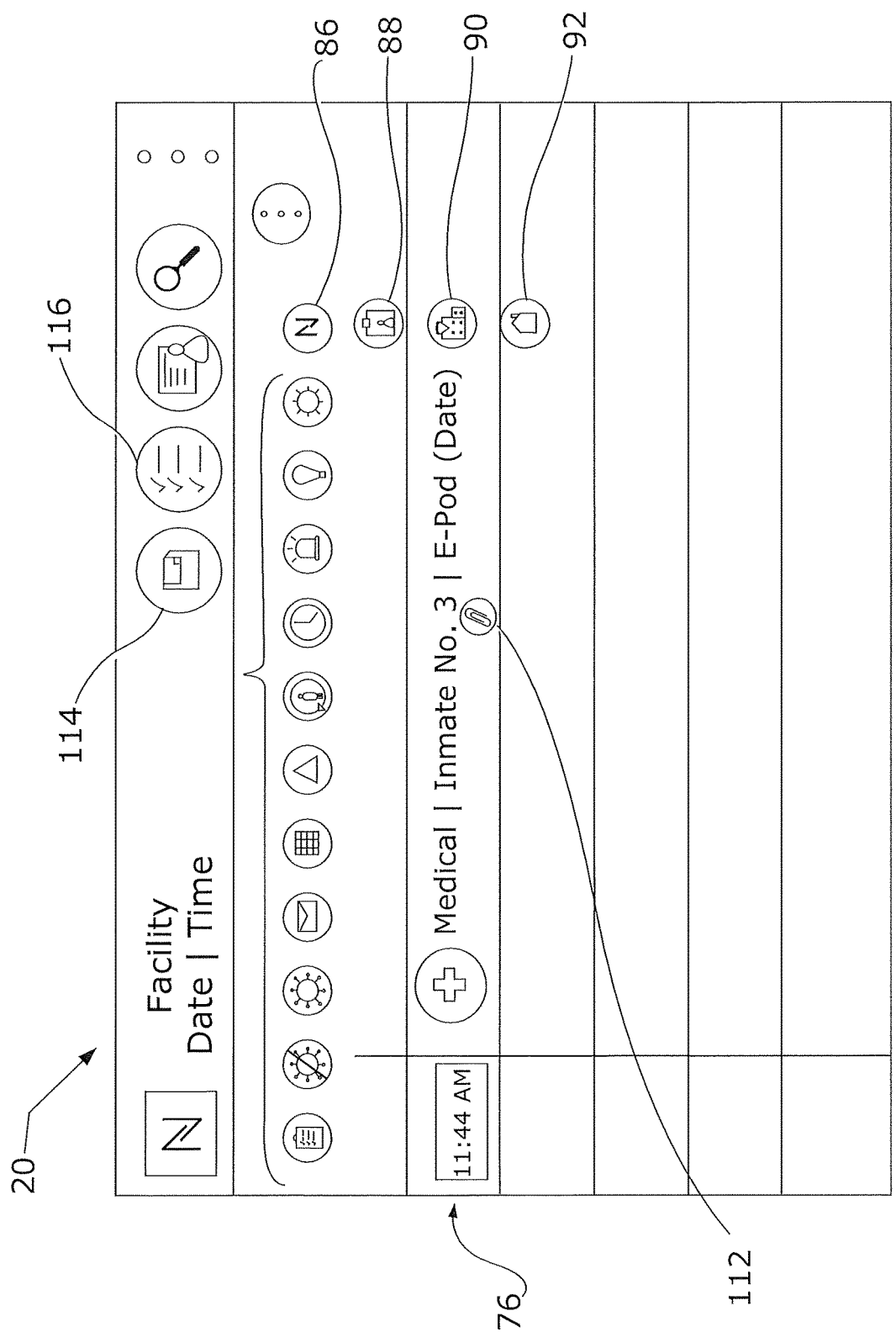
FIG. 18 is a screen shot, showing the note input page of the interface of the present system.

An exemplary screenshot illustrating the steps that the user is takes to submit a note 76 is shown in FIGS. 13-21. As previously described, FIG. 13 allows the user to begin the process of taking a note 76 by clicking on a row on the graphical user interface 20. The time auto-populates, and the description can be added or selected by clicking on the note icon 86 and choosing the predefined text and image (emoticon 74). For purposes of this disclosure "emoticon" is defined as both the image and text associated therewith. If a user clicks on note icon 86 (long click, for example), a series of options will be presented to the user, as shown in FIG. 14. A pop-up wheel 96 is provided to easily allow the user to attach, link or collect (and attach) data or information to the note. For example, the user can attach a document (attachment icon 104), take or attach an audio recording (microphone icon 100), take or attach a photograph or video (camera icon 98), modify color or style of font in the text (text icon), add and complete a selected form (form icon 94), etc. To add a form, the user clicks on the form icon 94, which displays another pop-up window showing a series of frequently used or searchable forms. When selected, the user can complete the form easily to attach to the note. For example, the user could select an intake form. Intake form would open on the screen for the user to complete required information and submit to save the form. Once added, the form will be associated with the note 76. An attachment review icon 112 will be displayed on the note 76, as shown in FIG. 18. The form may be easily opened for viewing or reference by tapping on the attachment review icon 112. Notes 76 can also be highlighted—again, this can be accomplished by selecting the highlighter icon 102, shown in FIG. 14. Once highlighted, the note 76 will be highlighted and appears on the screen as highlighted when viewing the list of notes 76. Further, notes 76 can be tagged with a saved note by selecting the tag saved note icon 124. Finally, notes 76 can be struck through by selecting the strike out icon 126.

Figure 15:
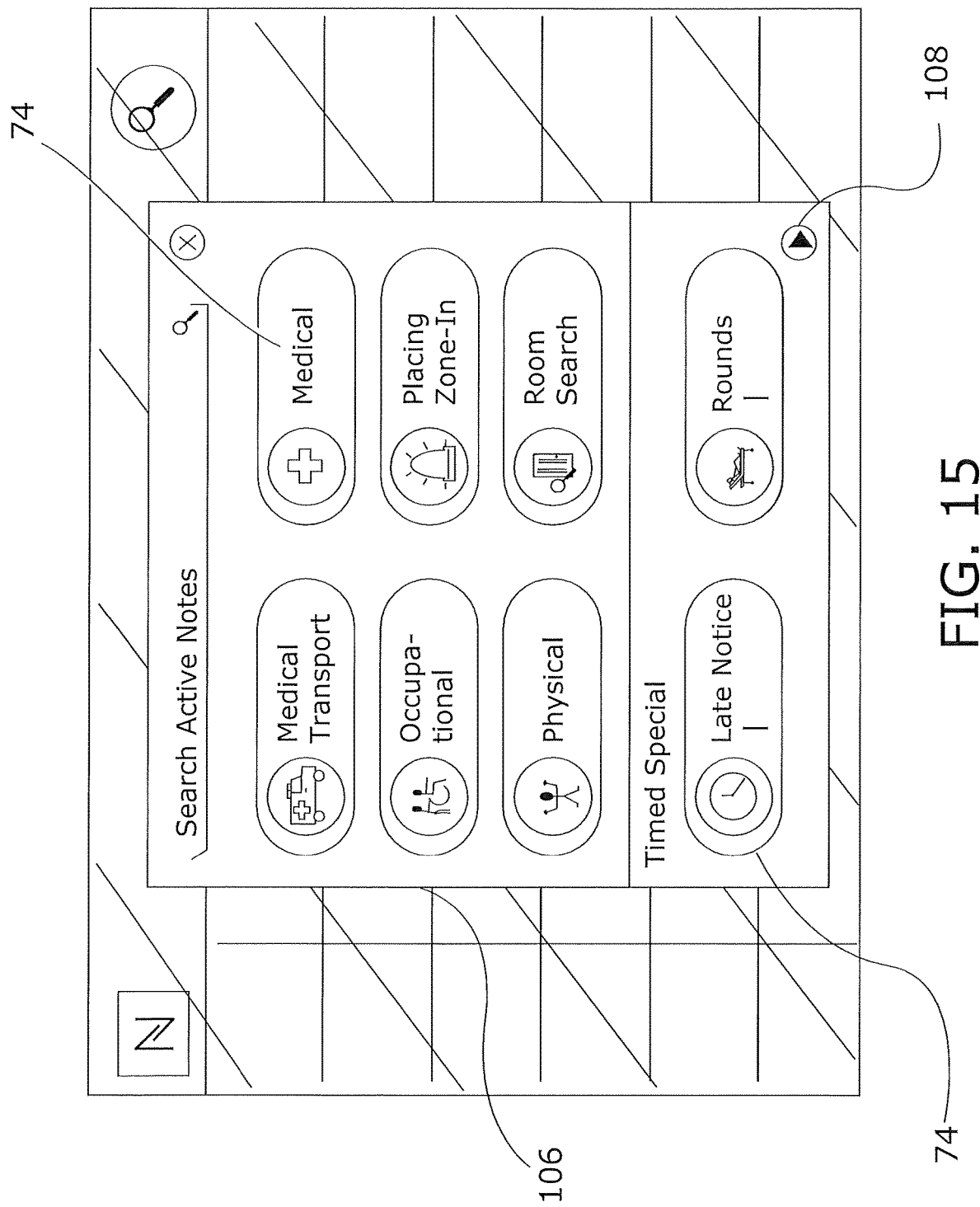
FIG. 15 is a screen shot, showing a pop-up screen with emoticons (or active notes) displayed on the interface of the present system.
Figure 19:
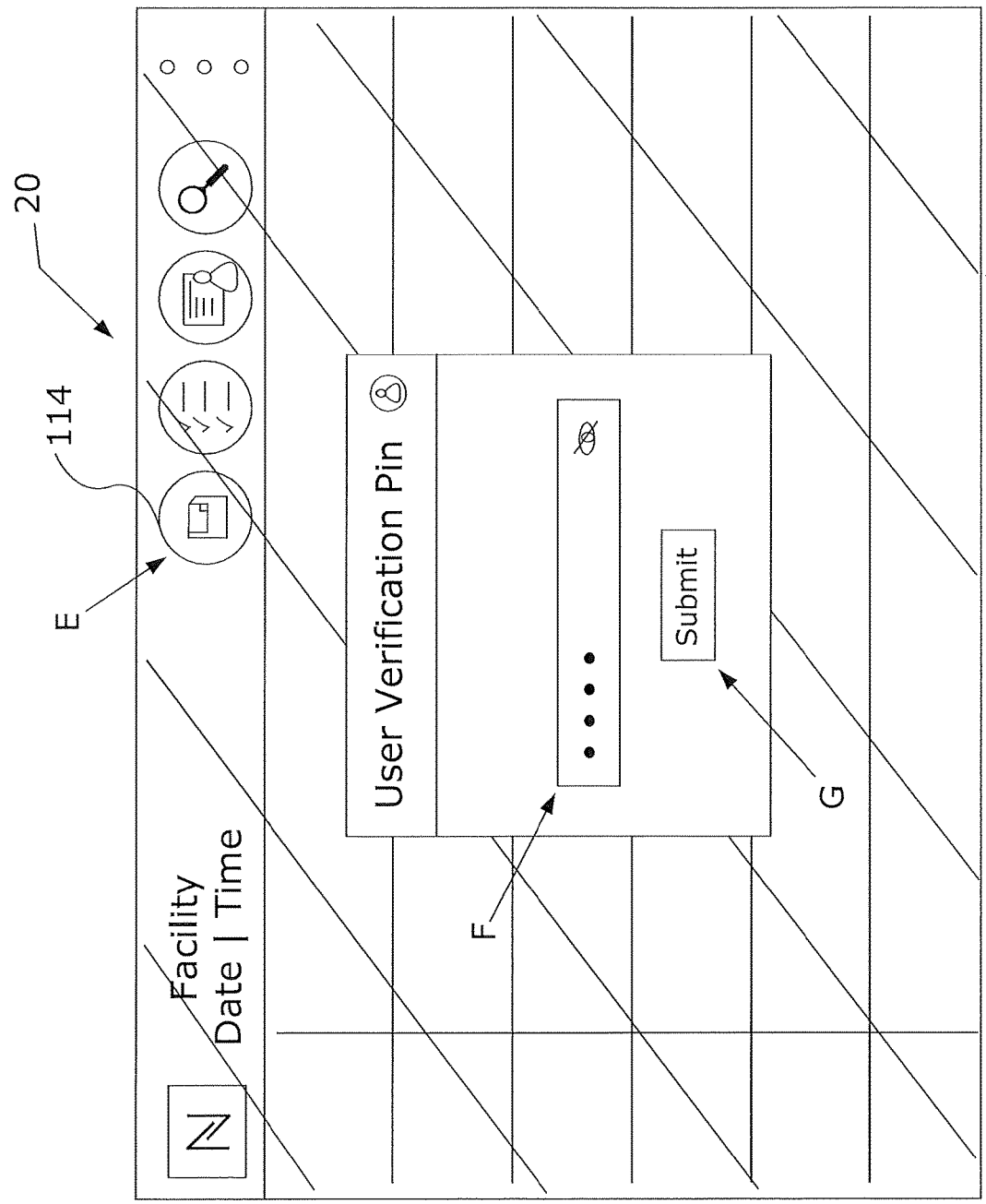
FIG. 19 is a screen shot, showing a pop-up screen to enter a user verification pin of the interface of the present system.
Figure 20:
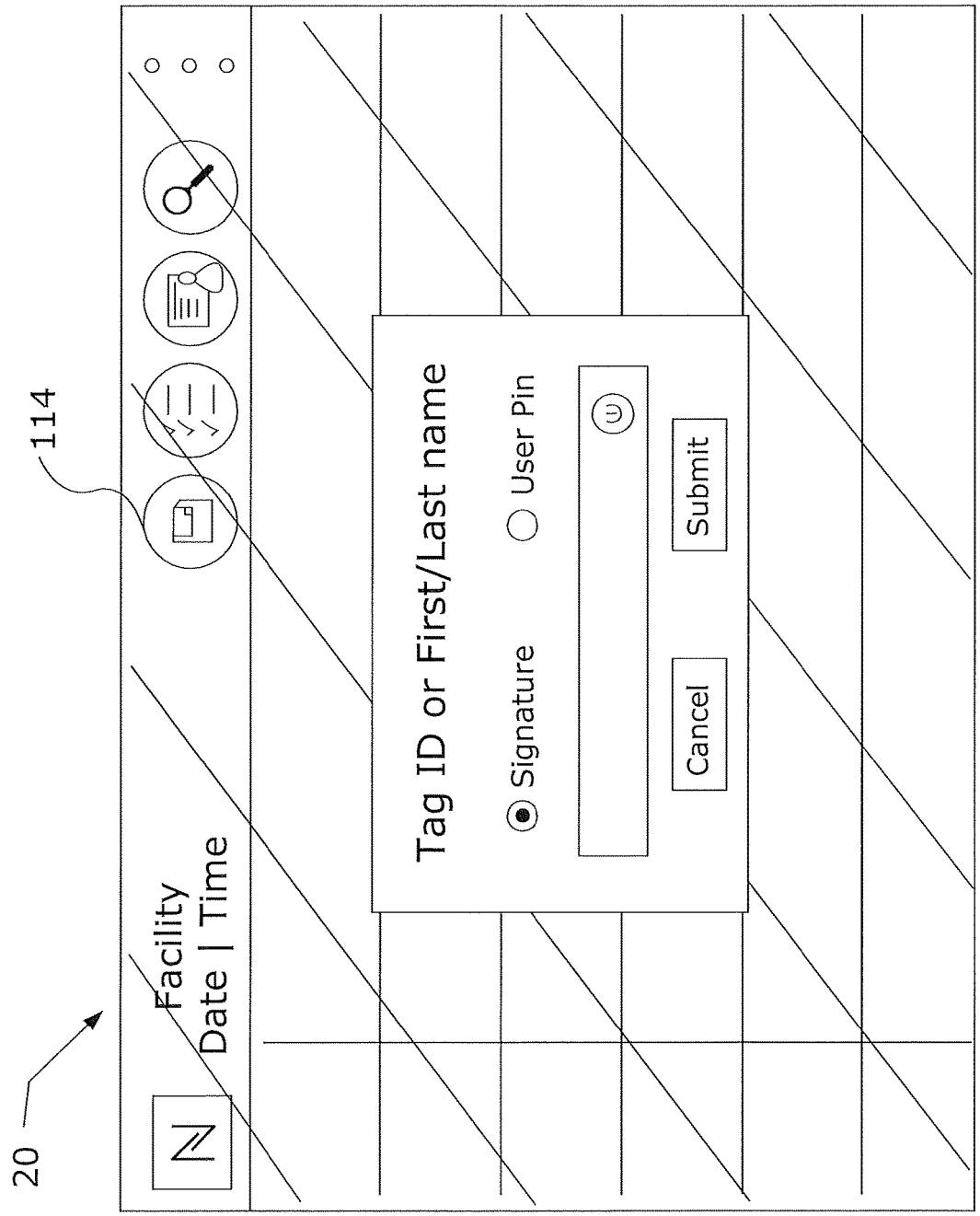
FIG. 20 is a screen shot, showing a pop-up screen to enter a verification or signature on the interface of the present system.

By clicking on note icon 86 again in the pop-up wheel 96, the user will be presented with a series of predetermined images with associated text in a pop-up window for active notes 106, to easily complete the description of the note, as shown in FIG. 15. These "active notes" (or emoticons 74) are easy, efficient ways for the user to consistently categorize (and therefore better organize) all notes. Here, the user may select an "active note," or emoticon 74. In one example, the user selects the room search icon. That selection may trigger the user to input additional information based on a preexisting rule. Therefore, user may be prompted to enter a room number and any contraband found in the search. Additionally, the present system and method may have an automatically triggered function. For example, in FIG. 15, the "timed special active note" include two examples of these automatically triggered notes, "late notice" and "rounds." In these examples, if a user selects a timed activity, the timer can start to track the activity. Additionally, the emoticons 74 can allow for integration with outside functions (such as visitor logs) through their use. In the illustrated example, the user selects "medical" icon and submits using the submit icon 108. FIG. 16 illustrates the view for the user after the "medical" icon is selected and submitted. The text area 55 is automatically populated with the emoticon 74. Therefore, with less than 3-4 clicks, the user has efficiently entered a description. Although not shown, the user also can click on the client icon 88, which will similarly display a pop-up window with a searchable list of clients (in this case inmates). The user can search for and select a client. The clients can also be sorted by most recent, alphabetical or location (or any other known means). Once selected and submitted, the client will be displayed in the note 76, as shown in FIG. 16. This process can be repeated for the location icon 90 and facility icon 92. For example, as shown in FIG. 17, the user can easily select the facility by clicking on the facility icon 92 (arrow A), thereby displaying a pop-up window for facility 110 containing a searchable facility database. The user begins to enter text in the search area (shown by arrow B), and the list auto populates, (here, showing the options in alphabetical order). The user can select the facility, shown as arrow C, and once selected, submit (shown as arrow D). The user will be brought to a screen showing the full note 76, with the inputted information, as shown in FIG. 18. The reader will appreciate that as notes 76 are added, they will appear on the same screen so that the user can view the notes 76 entered on that day. To submit the note, the user clicks on the save icon 114 (action shown by arrow E), a pop-up window appears to enter a verification pin (arrow F), as illustrated in FIG. 19. Once entered the user can click submit (arrow G). The program then requests a tag ID or signature, as illustrated in FIG. 20. The user is required to verify note 76 prior to saving the note entry. This can be done through a signature or a user pin that is unique to the user. This provides yet another security feature of the present system, allowing for data integrity. For example, now, only completed and signed notes are submitted to the central database.

Figure 21:
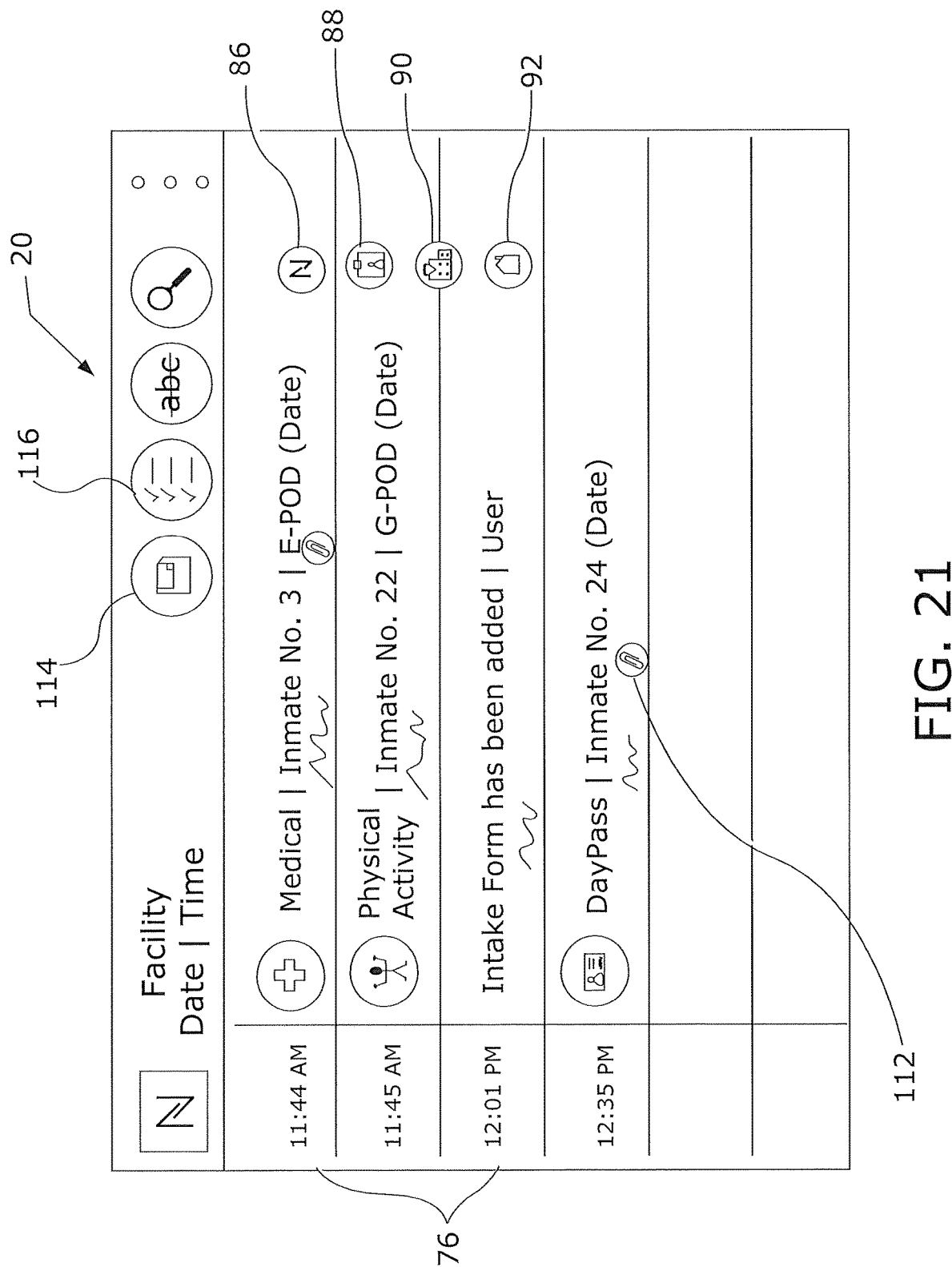
FIG. 21 is a screen shot, showing the note input page of the interface of the present system.

FIG. 21 illustrates a screenshot of several notes 76 that have been entered by a user throughout the day. The view illustrates several notes with attachments, images and emoticons. The notes typically have an "active note" (or emoticon 74) associated therewith), however it is possible that there will be notes 76 that only include an added form or an audio recording, for example. Notes 76 can also be highlighted using the highlighter function to bring attention to a note 76 or further categorize notes for the user. Additionally, the user will be able to see if the notes 76 have been submitted and signed by viewing the list. The program can provide a notification for unsubmitted or incomplete notes, further decreasing the chance of error in compiling information in a facility. The notes 76 will also show the user if there is an attachment, such as an image, recording, form, etc. attached to the note 76. The attachment icon 112 can be clicked to view the attachment for review. Notes 76 may have various attachments attached or tagged to them. Forms 80, as discussed above, may be attached to notes 76 along with pictures, videos, and/or voice recordings (attached or transcribed). This feature allows for more integrative notetaking than prior art logbook entries 28. Using the present system and method, a user can categorize information, trigger business processes, and track meta information, which all allow for extensive and accurate data collection with minimal training to users.

Figure 22:
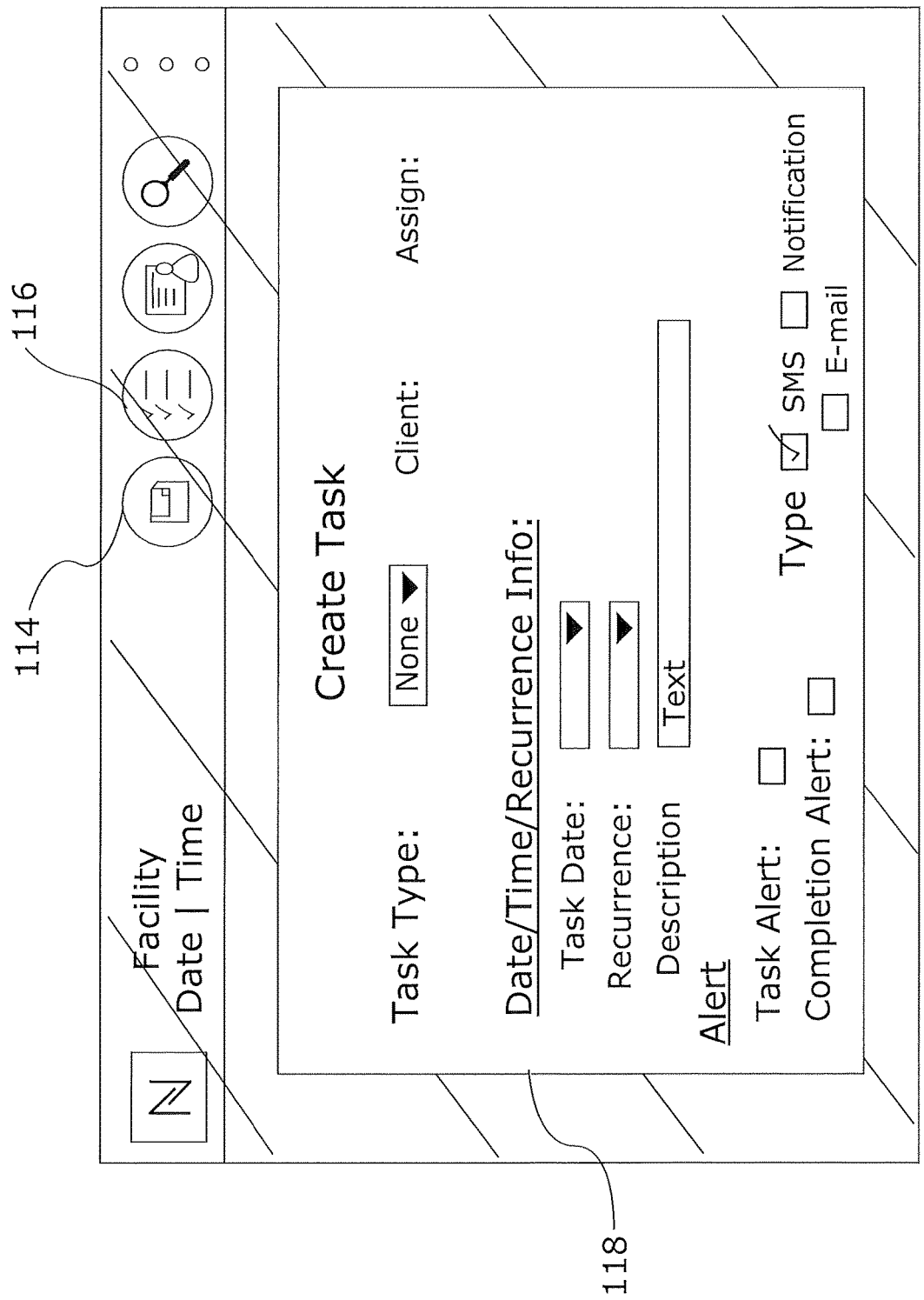
FIG. 22 is a screen shot, showing the task creation page of the interface of the present system.
Figure 23:
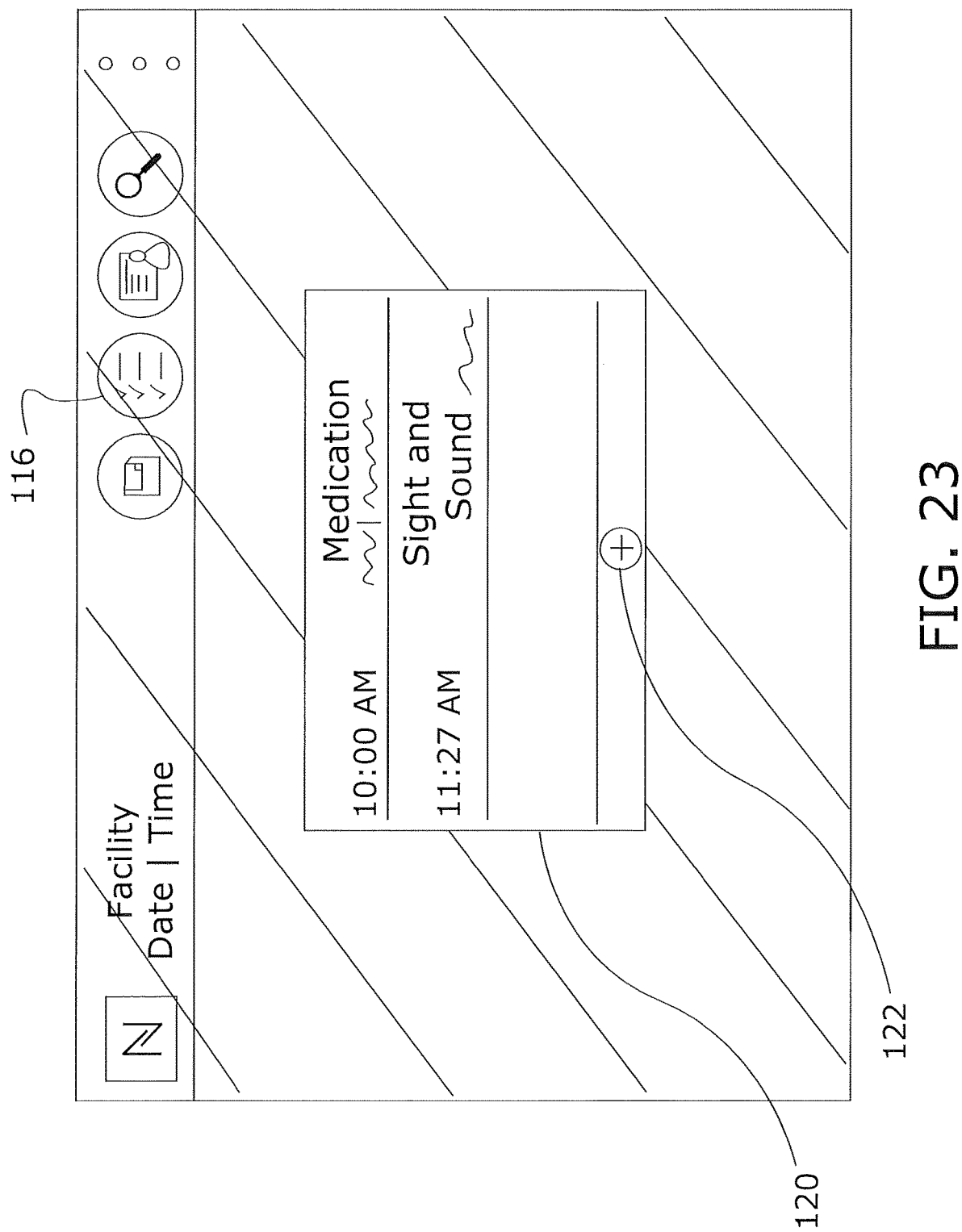
FIG. 23 is a screen shot, showing a pop-up screen to view upcoming tasks and/or to elect to create a new task.

FIG. 22 illustrates the creation of task 82. Task 82 may be many activities that a user may be required to complete, such as a bed check, approved travel, medication administration, etc. Task 82 entry provides the user with the advantage of tagging an activity in a streamlined and organized manner. Each task 82, created in a pop-up window for task creation 118, has a type, a date and time, a recurrence ability, a description, and an alert type, should the user desire one (however, any "data entry point" can be used). Once task 82 is created it appears on a list of tasks in a pop-up window for task list when the user clicks on the task icon 116, as shown in FIG. 23. Tasks 82 can also be set to recur on specific days and therefore used repeatedly without recreating the task 82. For example, if the user creates a task 82 for a user to provide medication every Monday to a specific client, the program will alert the user of the task 82 every Monday (and appear on the list of tasks 82 to complete), prompting the user to complete the task 82. Upon completion of task 82, an automated report is generated and attached to the completed task 82, creating meta data stored in computer program product 20 and appearing on the list of tasks (shown in FIG. 21). Note that new tasks can be added by selecting the add icon 122 ("+") at the bottom of task list 120.

One example of a task is a client transport, approved by an administrator. Once created, the user selects the task to be completed, in this case, the transport of a client from one location to another. GPS tracking can be used to monitor the location of the user's device. It is in this manner that the program can associate that metadata with the task including the route taken, time and date of transport. The reader will appreciate that all known automatically collected data can be associated with any known task for comprehensive information. In another example, a user may be required to administer medication. The user will select the "medication" task (shown in FIG. 23) to begin the task. A recurring alert may be useful since medication is generally required to be administered at particular times during the day. The alert may be provided via text to the user (email or other). The user will open the task and view a series of easy entry icons to select from. For example, the task may require an image capture to show the prescription administered. Once complete the user selects complete and a signature pop-up appears for the user to either enter a signature or a user pin to submit the task (similar to FIG. 20). For bed or cell checks, task 82 will be titled "bed check" or "cell check." In this task type, a user will configure the facility definition of bed or cell, and visual recognition may be used to confirm the location of said bed or cell. The user may also attach pictures under task 82 in this example to further bolster the data provided and confirm location of the bed or cell.

Figure 24:
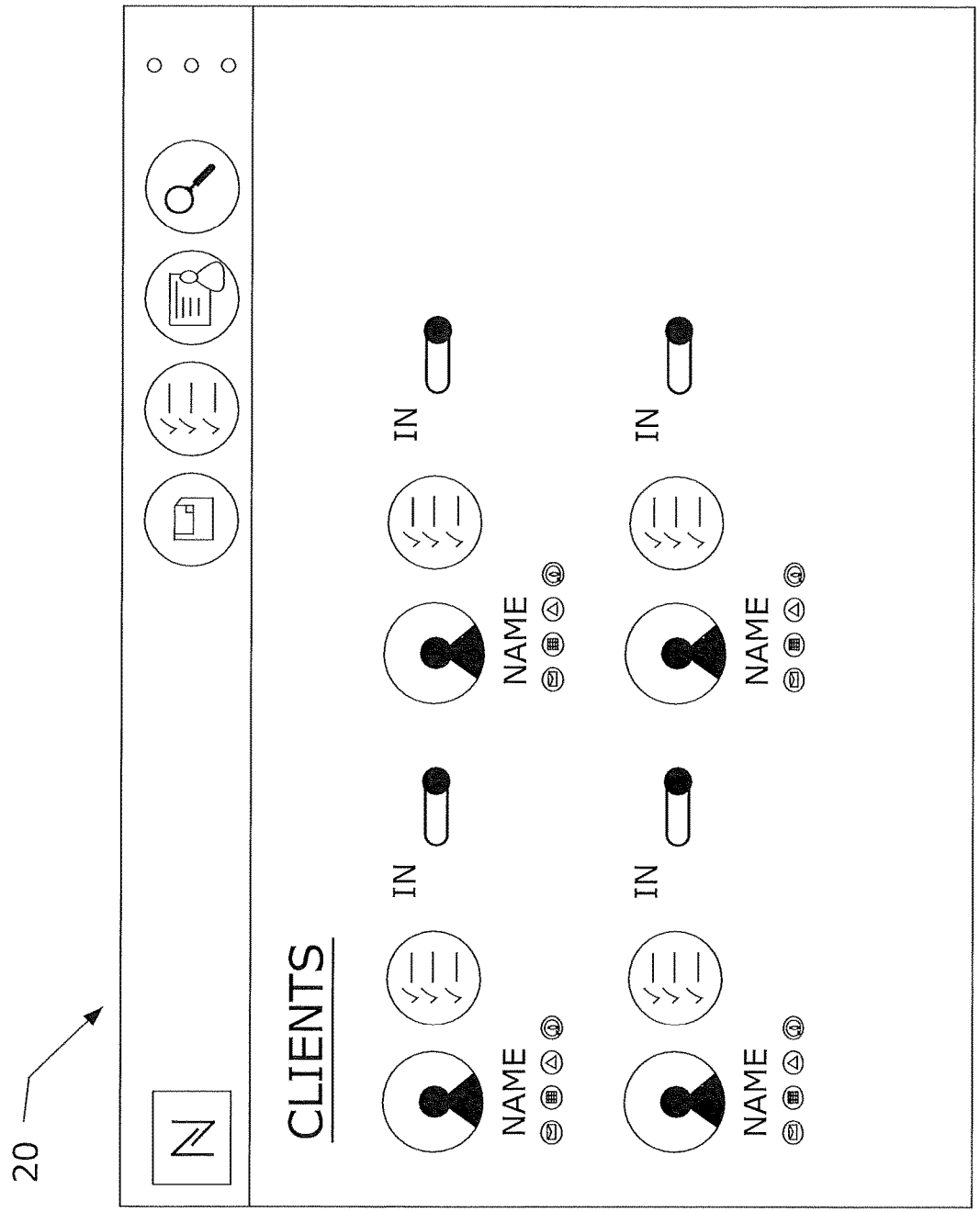
FIG. 24 is a screen shot, showing an overview of the individuals (clients) monitored on the present system.
Figure 26:
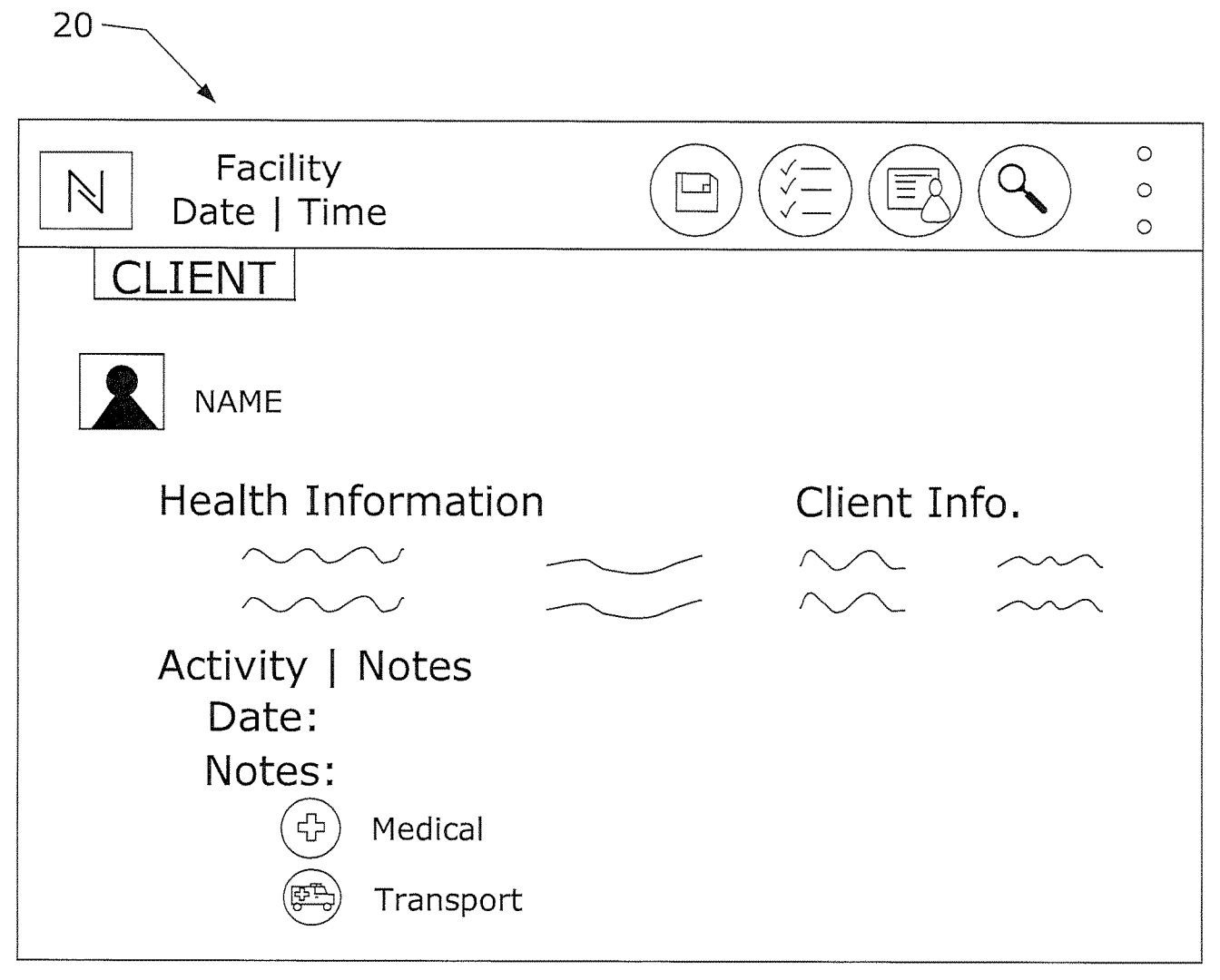

FIG. 24 illustrates a screen shot of a page showing clients. This page would typically be only accessible to an administrator such that the administrator could view all clients on one page. Each client can be clicked on to open the individual client's page (shown in FIG. 26). The administrator can update certain biographical information about a person being monitored, including their picture, name, date of birth, phone number, address, and the like. The administrator can also enter internal information about the person, including their room number and status at the facility, health information, medication, height, weight, eye color, hair color, and the like. This page allows a user to enter and view pertinent information about persons being monitored, allowing for accuracy when identifying a person at the facility as well as providing the user with a database of all information of a person being monitored. For example, the summary below an individual in FIG. 24 may show that the client has an allergy—it is in this manner that the pertinent information may be better processed by the administrator or user and remembered.

Figure 25:
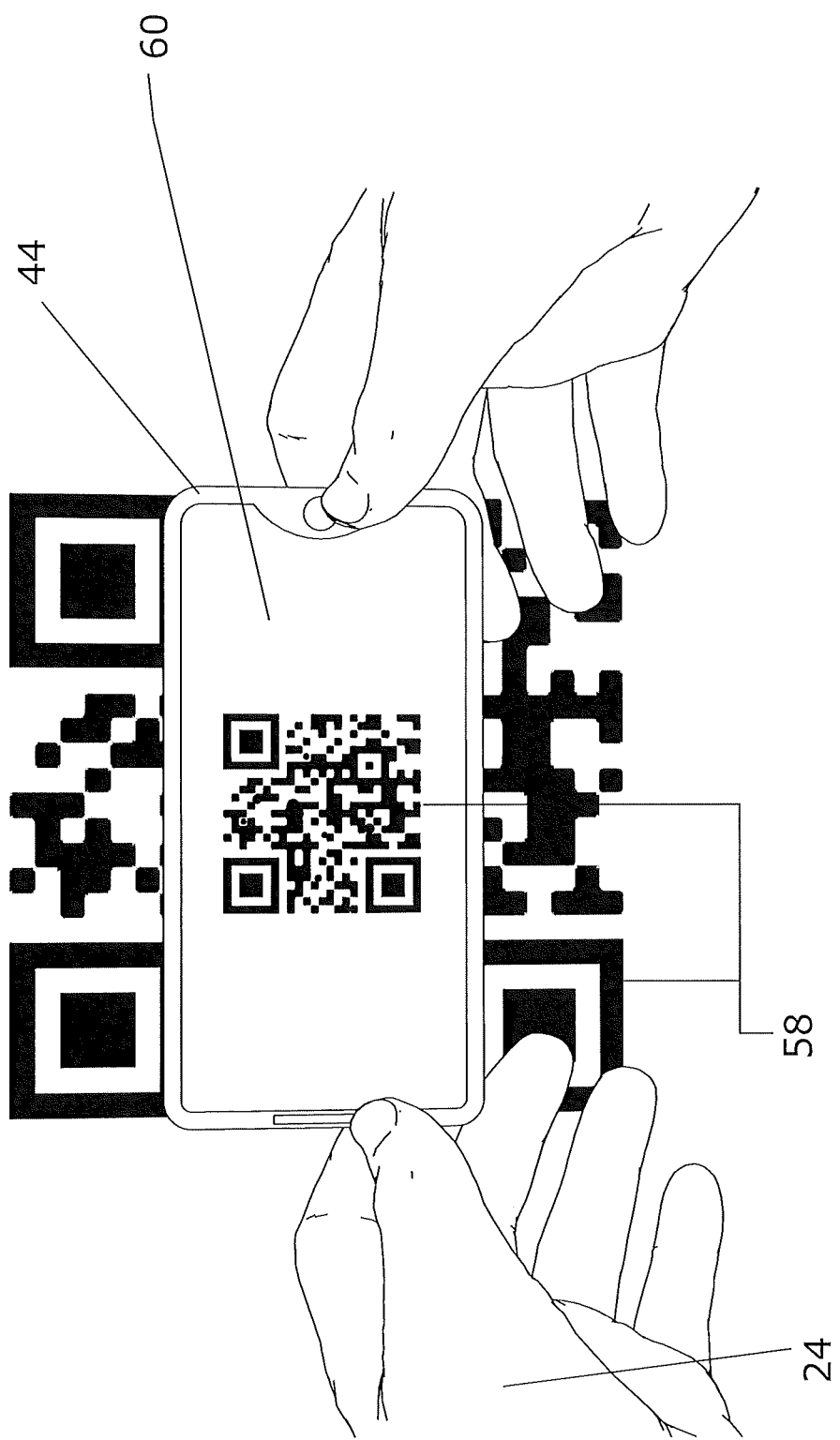
FIG. 25 is a screen shot, showing the QR code of the present system and method.

FIG. 25 illustrates a scanning process of the present invention. Mobile device 44 includes a digital camera (facing away from user and towards QR code 58 in FIG. 21). User 24 opens computer program product 20 (not shown) on his or her mobile device 44 and aims the device at the QR code 58 displayed at a given facility. An image of QR code 58 appears on display 60. Then, user 24 captures a depiction of QR code 58. Software running on mobile device 44 confirms the suitability of the image. The image of QR code 58 is temporarily stored. Application software running on mobile device 44 may then be used to recognize the characters contained within the image, and QR code 58 may then be stored as a simple character sequence. Additionally, a QR scanner can be located when an individual enters a room. That QR scanner can be connected wirelessly to a server for the collection of data from individuals scanning a QR code when they enter a room.

While a QR code is used to depict the scanning process of the present system and method in FIG. 25, the reader will appreciate that the same method can be used for input devices, such as biometric scanners (fingerprint, eye scans, facial recognition, or manual tagging). It is through this scanning process that a user or client location can be tracked throughout the facility. The input devices themselves can be linked to the computer program product and/or the mobile device collecting the input can be running the program. This same scanning process may be used to track any persons (clients) whose information is being inputted into the present system and method by a user or being collected by an input device. In the event a user is using the scanning mechanism while offline, the present system and method will automatically revert to the use of a PIN code, allowing the user to still attach the picture captured by the digital camera of mobile device 44 so that there is stored record of such location tracking in the case of an audit. Returning to FIG. 26, the client information, including the location may be stored on the client page. The location of the client will be shown alongside all information about the client (health information, tasks or notes completed involving the client, etc. This view can also show a timeline of the client throughout the day, including all activities tagged to the client.

Figure 27:
FIG. 27 is a screen shot, showing an exemplary bed check report on the interface of the present system.

FIG. 27 illustrates a bed check report of a user. This page is particularly useful in facilities such as a hospital or a correctional institution, in which the subjects being monitored are required to be in bed at a time and location. The report provides the date and time the bed check was performed, as well as the room, the individuals' names, and the total number of individuals identified in each room at the date and time. A signature of the user is required for added security and accuracy of reporting.

Figure 28:
FIG. 28 is a screen shot, showing a fire drill log on the interface of the present system.

FIG. 28 depicts a fire drill log. A user may implement this form during a fire drill such that the user can maintain details about the fire drill and ensure the safest facility as possible. For example, a user can check emergency lights, fire horns, pull stations, etc. The user is also able to include the date time, shift, etc. that the fire drill was performed. This information is useful in providing the safest facility possible while also including important information about when the drill was performed and by which user in case such information is necessary in the future.

Figure 29:
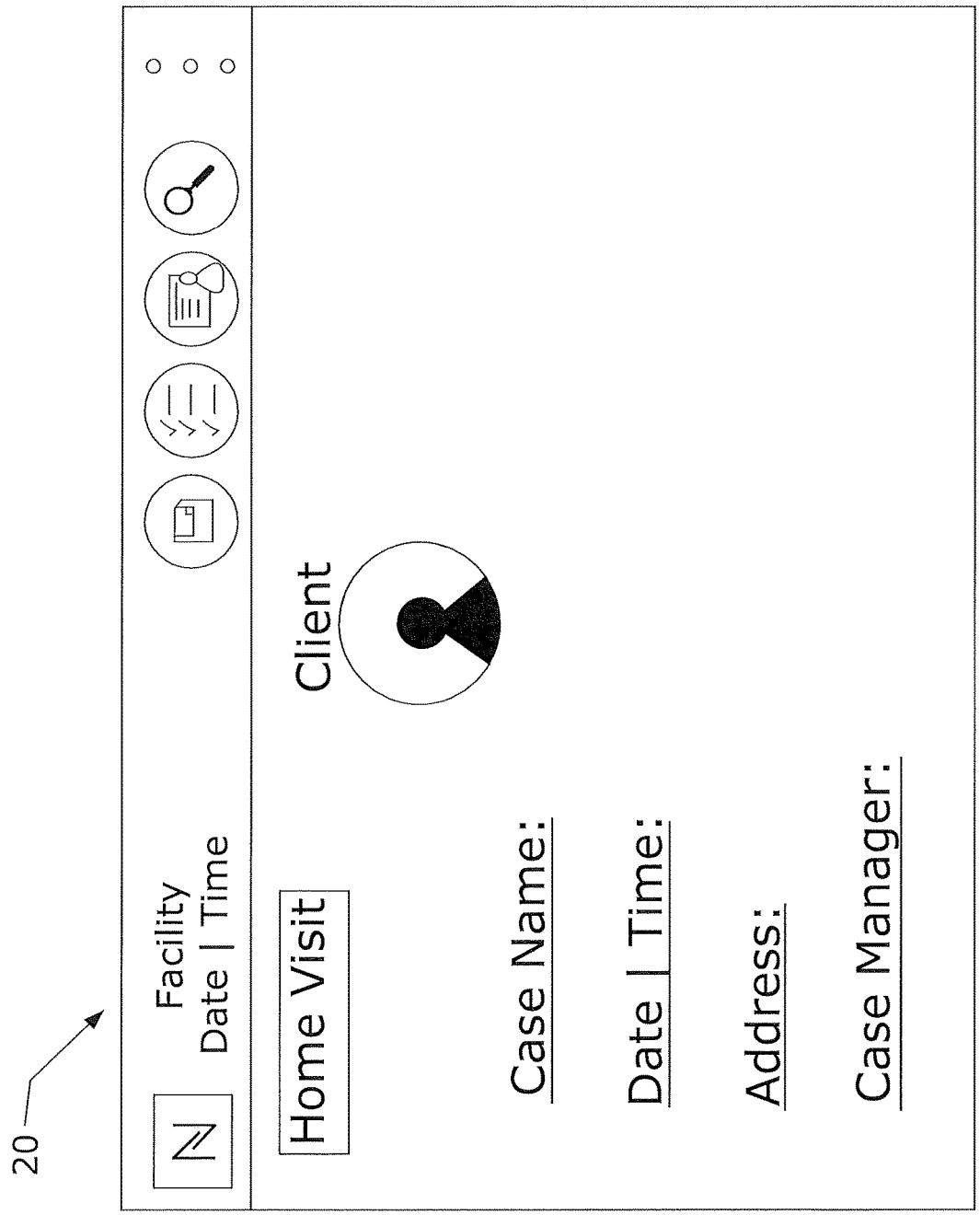
FIG. 29 is a screen shot, showing a home visit log on the interface of the present system.

FIG. 29 depicts a home visit form, which may or may not be applicable depending on the facility implementing the present system and method. This form allows a user to track the case, date, placement address, time of home visit, and other identifying information. The form provides a streamlined place to enter imperative information regarding a home visit, such that a user may have more time and focus on the home visit at hand. Thus, this form provides a safe, secure, easily accessible place in which the user may store information out on the field and revisit the same information later.

Figure 30:
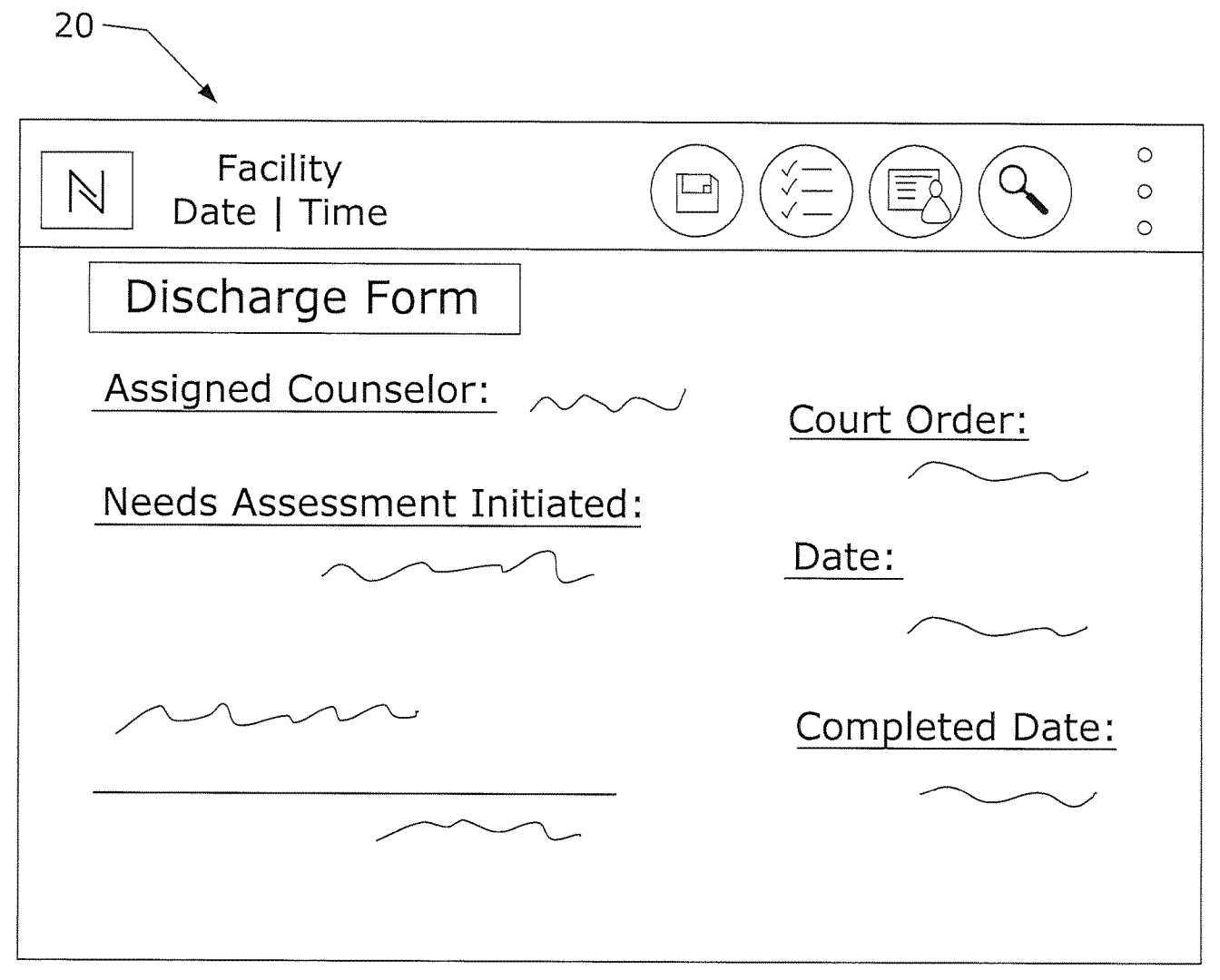

FIG. 30 depicts a discharge form. Again, this form provides a place for imperative information that a user will input about an individual being monitored. The form provides for very particular questions, such as whether the participant is from a military family, ensuring the most detailed and accurate information is stored on computer program product 20.

Figure 31:
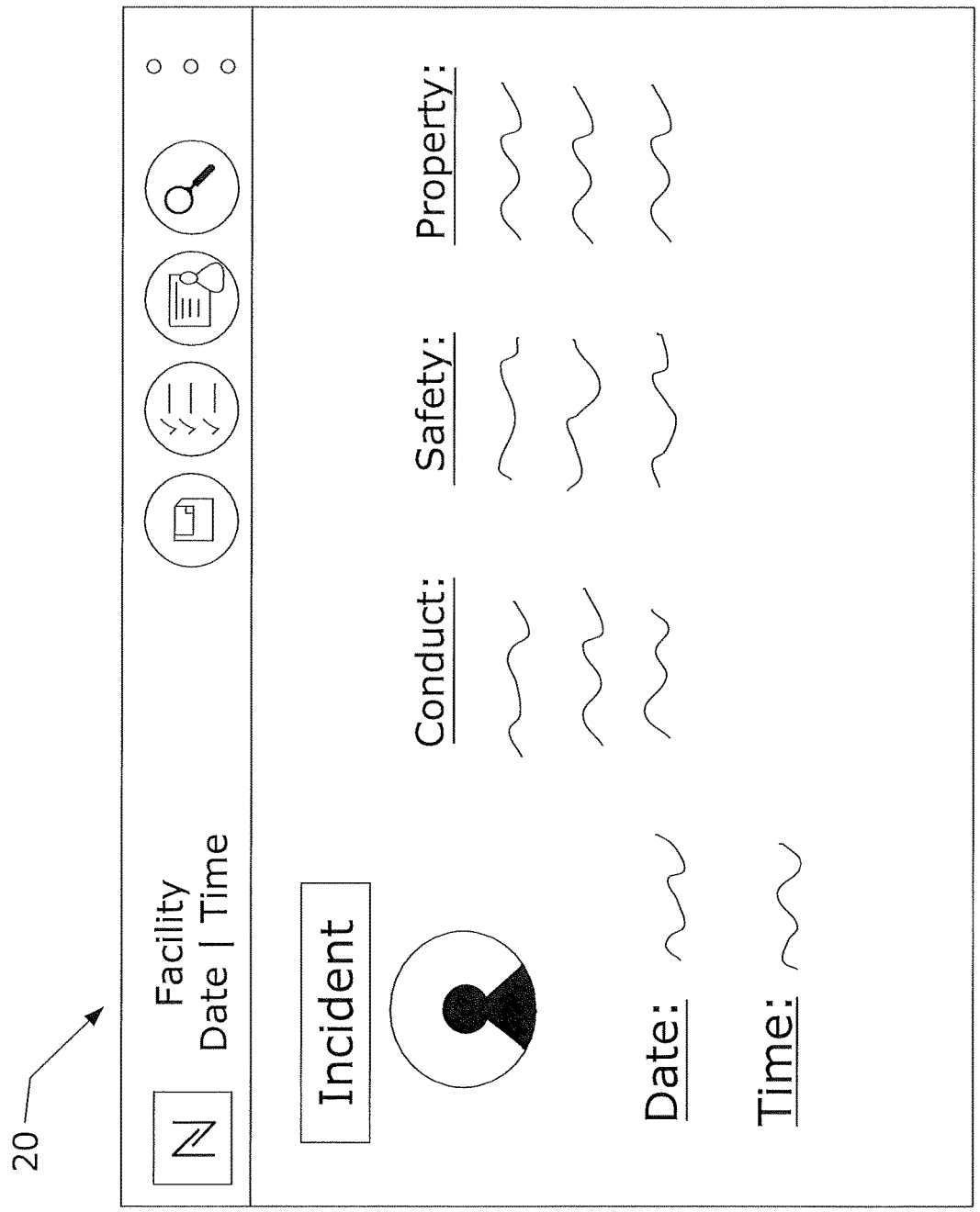
FIG. 31 is a screen shot, showing an incident form on the interface of the present system.

FIG. 31 depicts an incident form. Such a form allows a user to document information about an incident that may occur at the facility. For example, the form allows a user to document whether there was "on-duty staff aggression" by a staff member or "property destruction" by an individual being monitored. This form is advantageous to a user because it allows a user to document behavior, and therefore patterns, regarding a individual being monitored, allowing for greater efficiency and an improved database. Users, locations and facilities can be linked to incident forms. Reports can be run to view specific incident forms.

Figure 32:
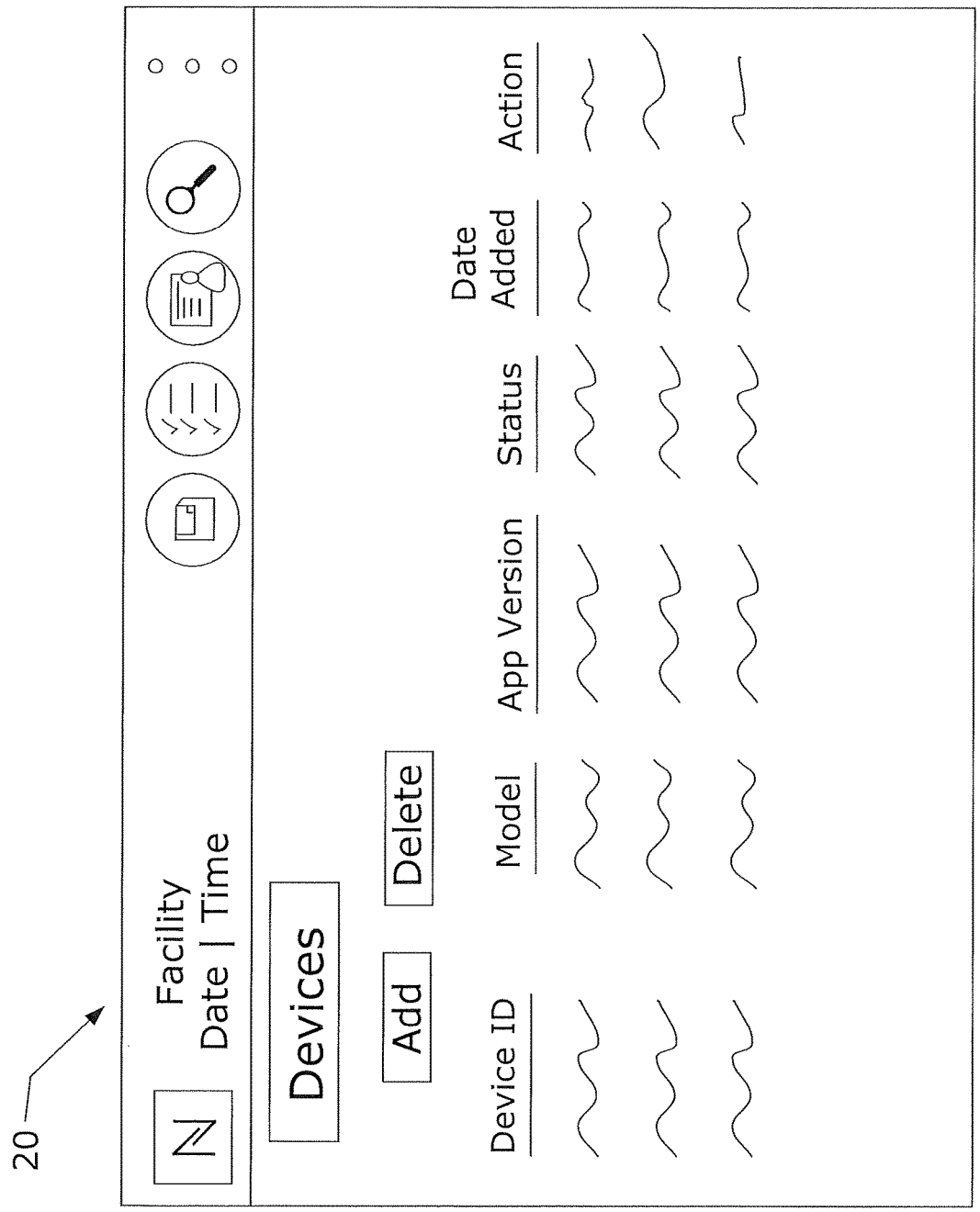
FIG. 32 is a screen shot, showing the devices that are active in the current system.

FIG. 32 displays the devices page. This figure depicts another master facility view, in which a facility may monitor what devices are using computer program product 20. Each device has an identification number, allowing for ease of identification of any particular device when necessary.

Figure 33:
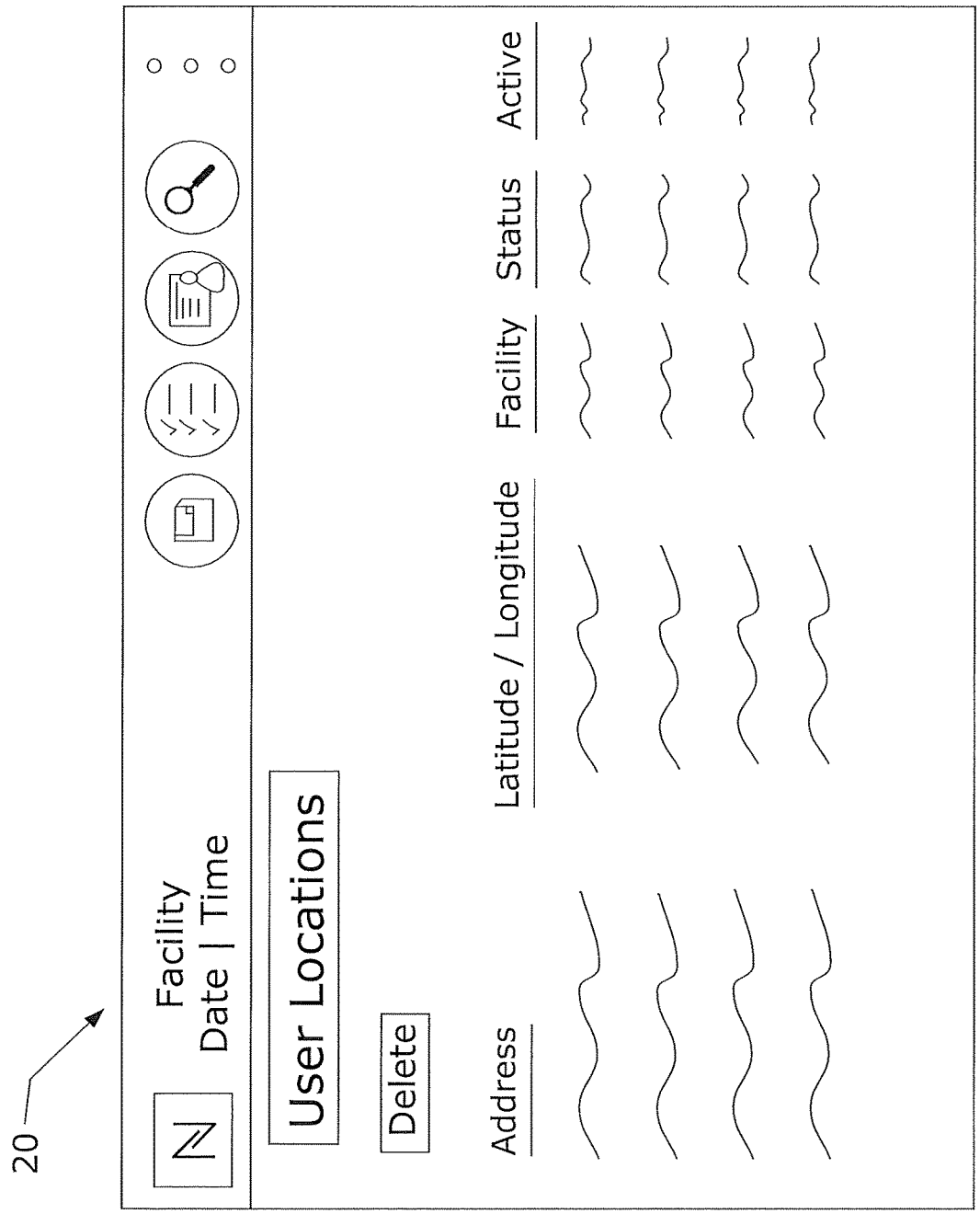
FIG. 33 is a screen shot, showing the user locations of the present system.
Figure 34:
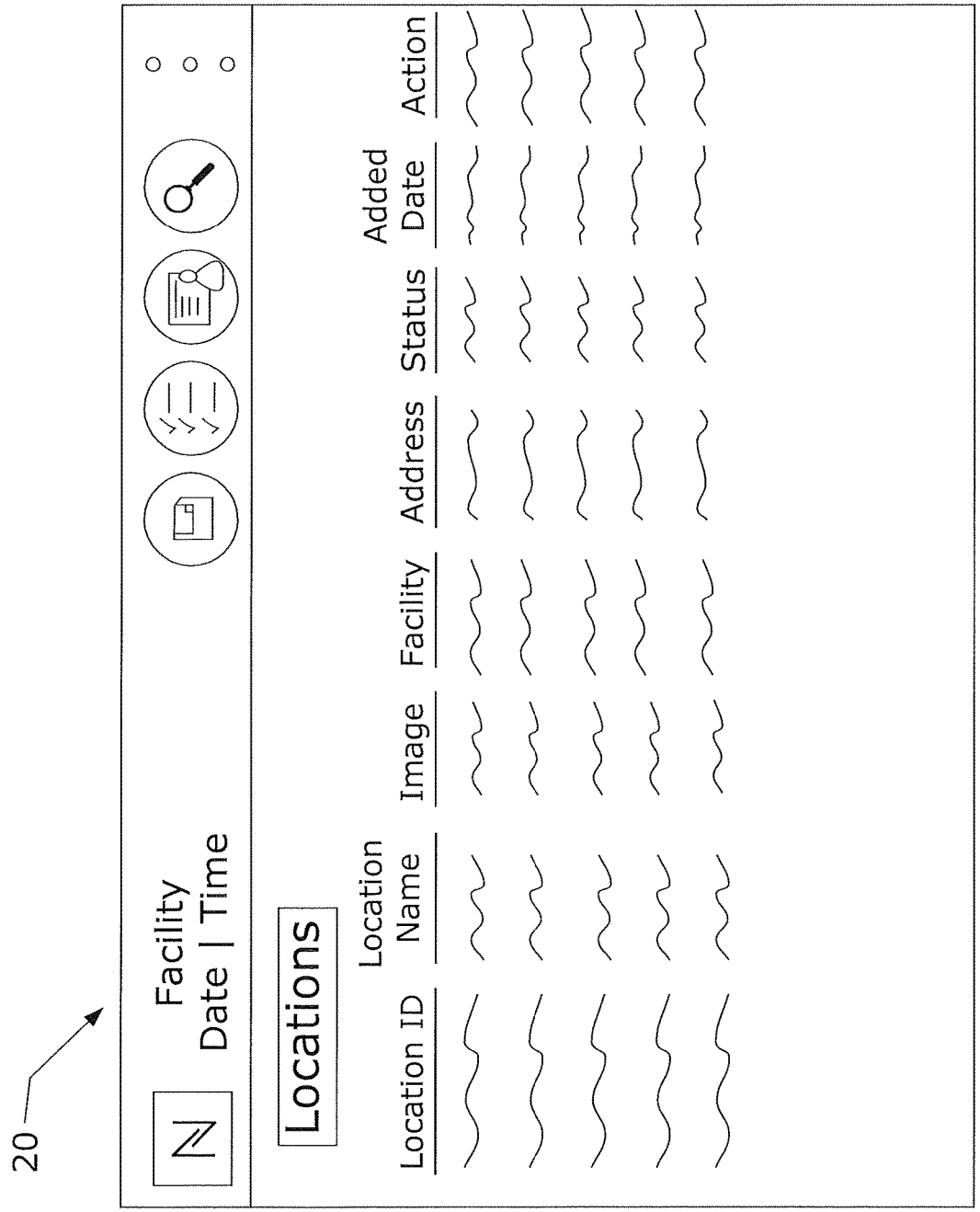
FIG. 34 is a screen shot, showing the locations of the subjects monitored using the present system.

FIGS. 33-34 provide different location pages. FIG. 16 provides the location of various users of computer program product 20. FIG. 17 provides for the location of various facilities in use of computer program product 20. Again, these views are displayed for administrators, rather than users of the present system and method.

Figure 35:
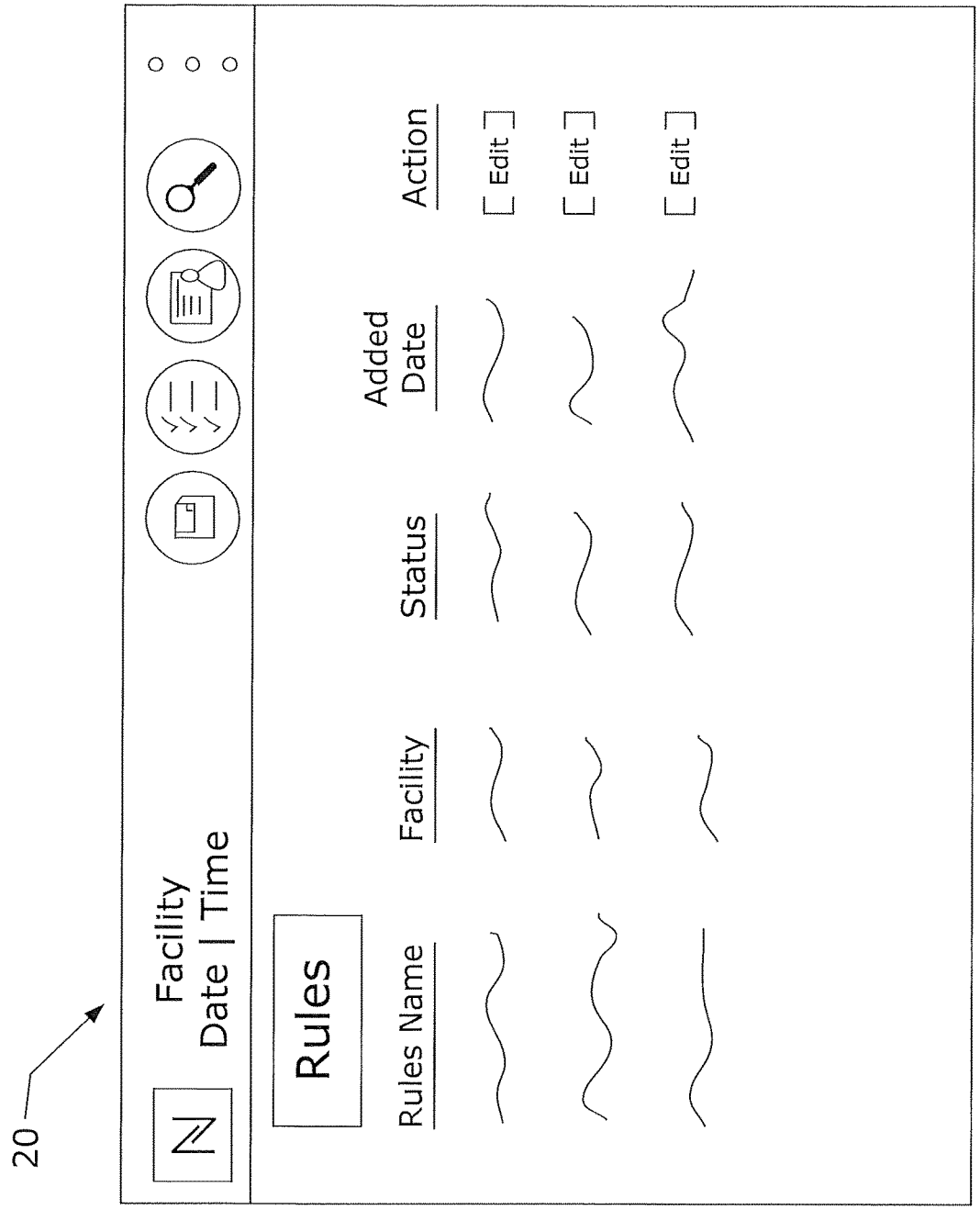
FIG. 35 is a screen shot, showing the rules page on the interface of the present system.

FIG. 35 illustrates the rules page. Each rule 78 has a name, facility, status, and date associated with it.

Figure 36:
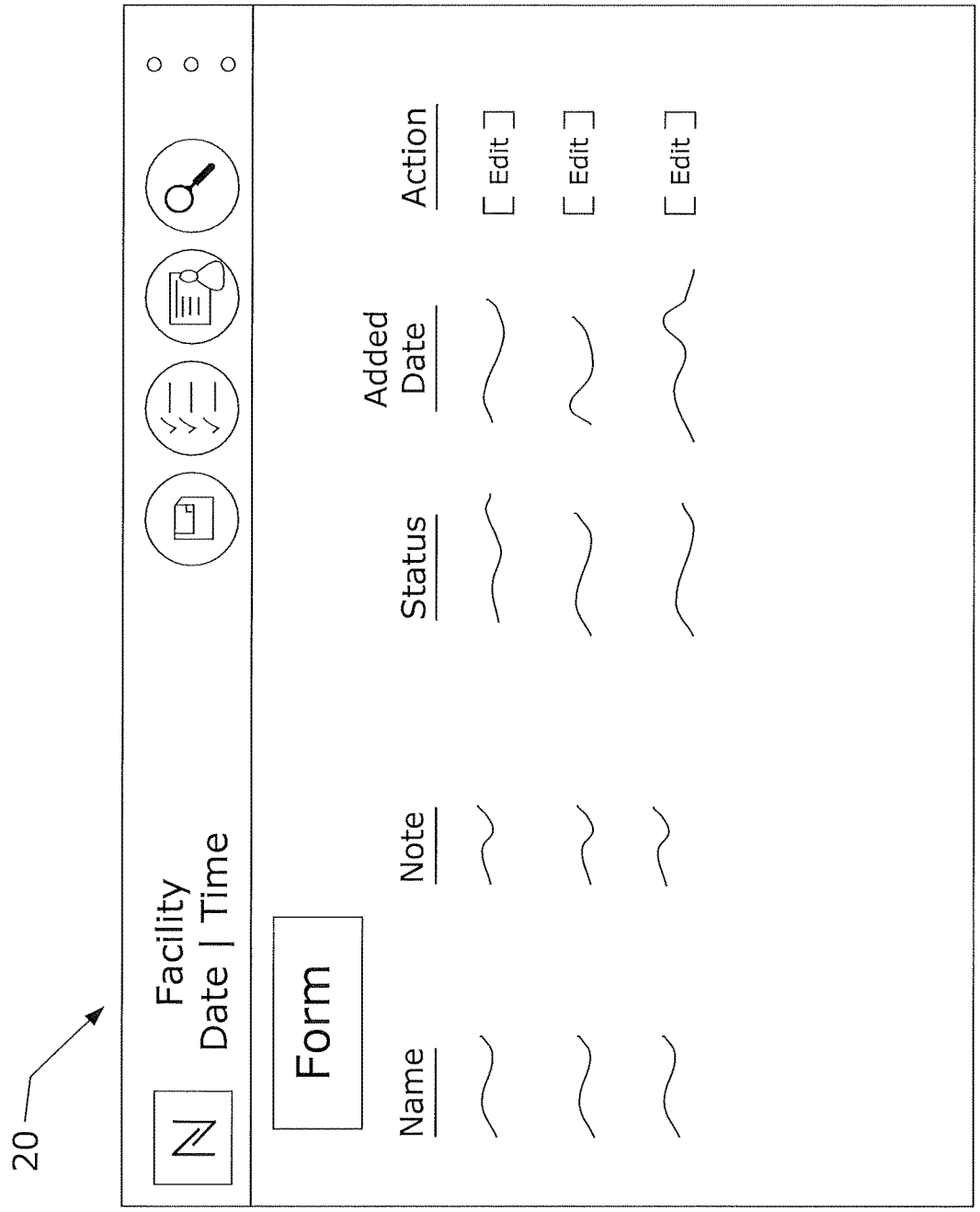
FIG. 36 is a screen shot, showing the forms page on the interface of the present system.

FIG. 36 illustrates the forms page. Forms 80 are created by a user. Forms 80 may have a note 76 associated with them. For example, form 80 may be a "fire drill" form, in which note 76 for a "fire reported" will be linked with said form. A user can maintain unlimited versions of forms 80 they create. Further, each time a form 80 is changed, a new note 76 is added with the updated form, and the old form and note are archived. When this occurs, each note 76 requires a new signature so that auditing details are maintained.

The present system and method provides many advantages over previous methods. For example, all data is tracked in a central database(s) or other storage medium so that the data is aggregated and can be used in a manner to provide graphical representations of the persons being observed/assessed. Further, biometric assistance is available for user log in. GPS tracking provides location monitoring to persons being transported. The user can use different emoticons and attach meta data into their digital notes, as well as the ability to copy and share their notes. A master facility view is available such that a facility is better able to aggregate all information compiled from their many users. Field security is also available with encryption, which may include privacy and compliance requirements. A visual history of individuals being monitored is available on the present system via tagging functionality, which may be done automatically using facial recognition or through manual tagging. SMS and e-mail alerts and notifications are available to alert the user of a required activity. The ability to create tasks with attachments and approvals is also available. Information may be shared from the user's device to other users on the system, which is pin and/or password protected. A user also can print forms and information using a defined form.

The preceding description contains significant detail regarding the novel aspects of the present invention. It should not be construed, however, as limiting the scope of the invention but rather as providing illustrations of the preferred embodiments of the invention.

Having described my invention, I claim:

1. A computer-implemented method in a server system for executing computer readable program code for a method of electronically tracking data associated with at least one observed individual for use in a controlled environment, wherein said method includes a user and at least one administrator:

providing said computer readable program code on said server system adapted to execute a set of instructions to display a graphical user interface;

providing a computing device having a screen to said user wherein said graphical user interface is displayed;

wherein said user is able to enter a first set of data associated with said at least one observed individual into said computing device;

wherein said user enters said first set of data by selecting a note icon from a series of quick entry icons to begin a first active note;

wherein when said user selects said note icon, said graphical user interface displays a series of emoticons to select from to begin entering said first set of data in response to a first task;

wherein said series of emoticons prompt said user to input said first set of data related to said first task;

wherein said administrator configures said first task to require a set of specific information in said first set of data;

wherein said user can continue to enter said first set of data using said series of quick entry icons;

wherein said user verifies said first set of data and submits said first set of data to said server system; and wherein said computing device communicates with said server system via a communications link to submit said first set of data;

providing at least one input device within said controlled environment to collect a second set of data associated with said first task and said at least one observed individual;

collecting said second set of data using said at least one input device and associating said second set of data with said first task;

submitting said second set of data to said server system;

wherein said first set of data and said second set of data associated with a number of tasks are displayed in a report based on a query with a plurality of filters including at least a date range, a facility type and a type of activity;

querying said first set of data and said second set of data on said report to return a first set of collected data, wherein said first set of collected data returns said first and second set of data associated with said number of tasks compiled and associated with said at least one observed individual based on said plurality of filters;

displaying said first set of collected data to show trends relating to said at least one observed individual;

querying said first set of data and said second set of data to return a second set of collected data, wherein said second set of collected data returns said first and second set of data associated with said number of tasks based on a query with said plurality of filters compiled and associated with a plurality of observed individuals; and displaying said second set of collected data to show trends relating to said plurality of individuals within said controlled environment.

2. The computer-implemented method of claim 1, wherein said at least one input device is a QR code reader.

3. The computer-implemented method of claim 1, wherein said at least one input device is a fingerprint scanner.

4. The computer-implemented method of claim 1, wherein said at least one input device is a microphone.

5. The computer-implemented method of claim 1, wherein said at least one input device is a video camera.

6. The computer-implemented method of claim 1, wherein said at least one input device is a mobile computing device.

7. The computer-implemented method of claim 1, wherein said series of quick entry icons includes a client icon, a location icon and a facility icon.

8. The computer-implemented method of claim 7, wherein when said user enters said first set of data using said series of emoticons said series of emoticons allow for automatic linking to a series of outside functions to supplement said first set of data.

* * * * *